(12) United States Patent
Schlanger

(10) Patent No.: US 8,985,709 B2
(45) Date of Patent: Mar. 24, 2015

(54) VEHICLE WHEEL SPOKE CONNECTION

(76) Inventor: Raphael Schlanger, Wilton, CT (US)

(*) Notice: Subject to any disclaimer, the term of this patent is extended or adjusted under 35 U.S.C. 154(b) by 913 days.

(21) Appl. No.: 12/930,643

(22) Filed: Jan. 13, 2011

(65) Prior Publication Data
US 2011/0101768 A1    May 5, 2011

Related U.S. Application Data

(63) Continuation-in-part of application No. 12/806,064, filed on Aug. 5, 2010, now Pat. No. 8,657,387, which is a continuation-in-part of application No. 11/879,333, filed on Jul. 17, 2007, now Pat. No. 7,784,878, which is a continuation-in-part of application No. 10/755,653, filed on Jan. 12, 2004, now Pat. No. 7,357,460.

(51) Int. Cl.
| | |
|---|---|
| *B60B 5/02* | (2006.01) |
| *B60B 1/00* | (2006.01) |
| *B60B 1/02* | (2006.01) |
| *B60B 1/04* | (2006.01) |
| *B60B 21/02* | (2006.01) |
| *B60B 21/06* | (2006.01) |
| *B60B 31/02* | (2006.01) |

(52) U.S. Cl.
CPC ............... *B60B 1/003* (2013.01); *B60B 1/0261* (2013.01); *B60B 1/041* (2013.01); *B60B 1/042* (2013.01); *B60B 1/044* (2013.01); *B60B 21/025* (2013.01); *B60B 21/062* (2013.01); *B60B 21/064* (2013.01); *B60B 31/02* (2013.01)
USPC .......................................... 301/104; 301/55

(58) Field of Classification Search
CPC .......... B60B 1/00; B60B 1/003; B60B 1/002; B60B 1/0246; B60B 1/0261; B60B 1/04; B60B 1/043; B60B 1/044; B60B 1/045

USPC ........ 301/55–59, 61, 104; 403/266–268, 273, 403/278, 282
See application file for complete search history.

(56) References Cited

U.S. PATENT DOCUMENTS

| | | | | |
|---|---|---|---|---|
| 436,993 | A * | 9/1890 | Overman | 301/104 |
| 1,909,344 | A * | 5/1933 | Green et al. | 403/284 |
| 1,934,102 | A * | 11/1933 | Stoler | 301/104 |
| 3,591,215 | A * | 7/1971 | Frost et al. | 403/396 |
| 4,729,605 | A * | 3/1988 | Imao et al. | 301/104 |
| 5,110,190 | A * | 5/1992 | Johnson | 301/55 |
| 6,036,281 | A * | 3/2000 | Campbell | 301/104 |
| 6,265,065 | B1 * | 7/2001 | McCallion | 428/375 |
| 7,192,097 | B2 | 3/2007 | Schlanger | |
| 7,192,098 | B2 | 3/2007 | Okajima | |
| 7,357,460 | B2 * | 4/2008 | Schlanger | 301/104 |
| 7,784,878 | B2 * | 8/2010 | Schlanger | 301/104 |
| 2003/0006643 | A1 * | 1/2003 | Chen | 301/104 |
| 2010/0301662 | A1 * | 12/2010 | Schlanger | 301/58 |

* cited by examiner

*Primary Examiner* — Jason Bellinger

(57) ABSTRACT

An improved vehicle wheel, including a rim, a hub with a central axle and an outer flange, a plurality of spokes extending between the rim and hub and a connecting element connected to at least one of the spokes. The spoke is a generally slender element with a longitudinal axis with a span portion between the rim and hub and a tensile axis of applied tensile load along the span portion. At least one of said rim and hub constitutes a bracing element. The connecting element includes an external surface and an internal cavity with an internal surface adjacent said spoke. The connecting element is joined to the spoke by means of a crimped joinder such that said external surface is pressed inwardly to plastically deform said connecting element to displace the internal surface toward the spoke. The crimped joinder supports tensile load through an engagement interface.

51 Claims, 20 Drawing Sheets

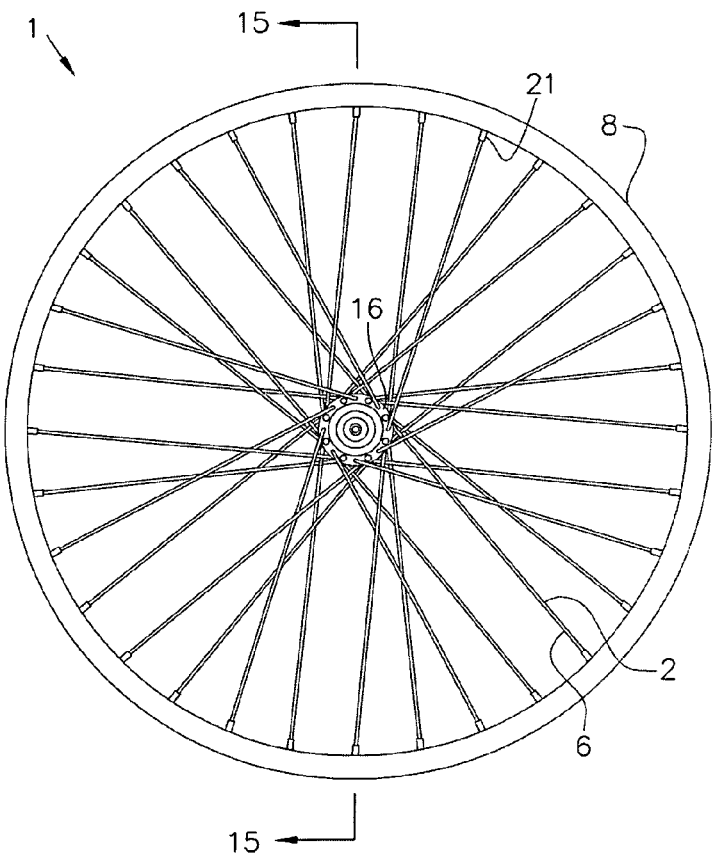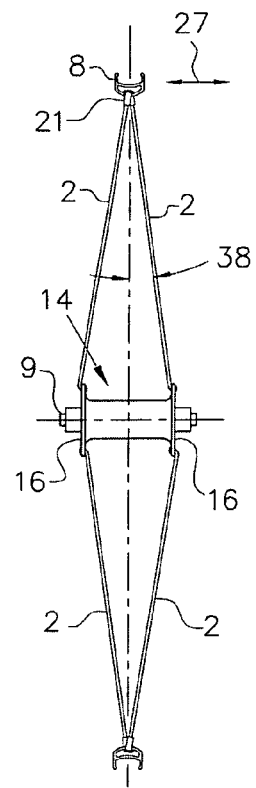
FIG. 2a
Prior Art
FIG. 2b
Prior Art
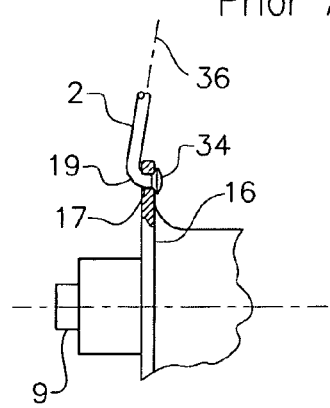
FIG. 2c
Prior Art

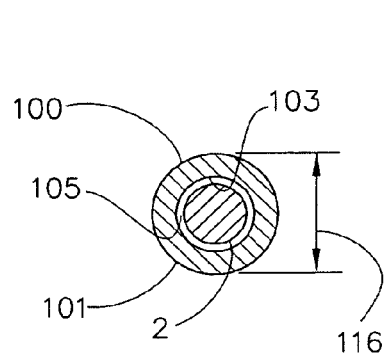
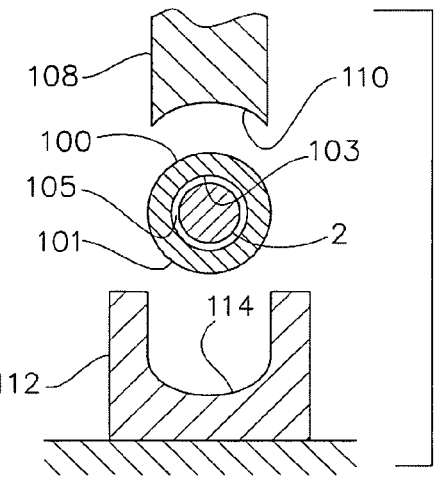
FIG. 8a
FIG. 8b
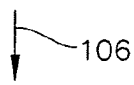
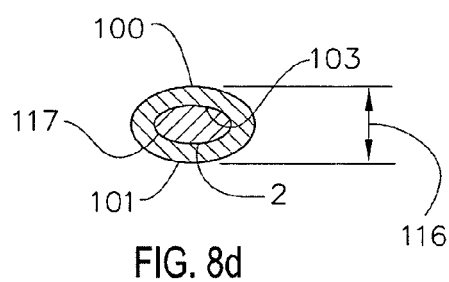
FIG. 8c
FIG. 8d
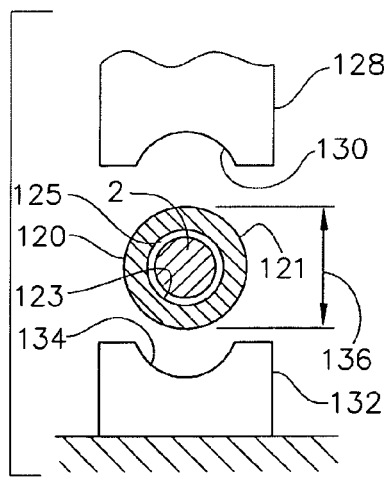
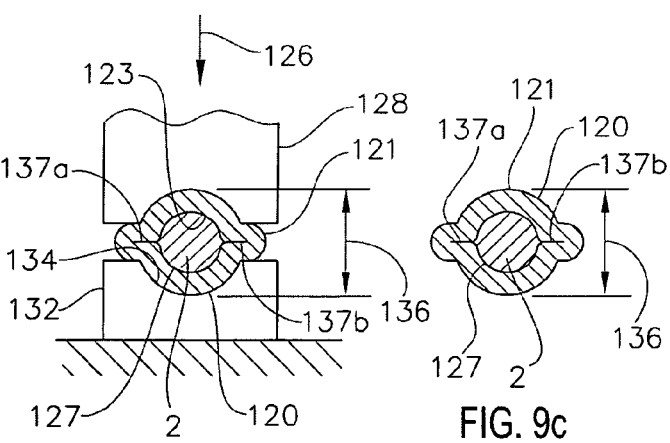
FIG. 9a
FIG. 9b
FIG. 9c

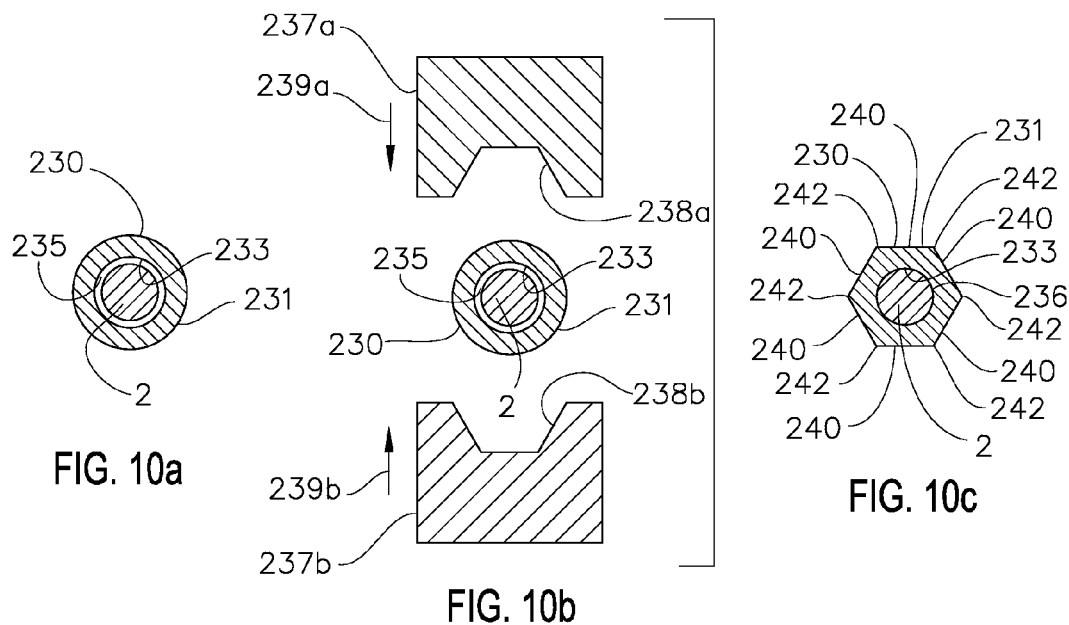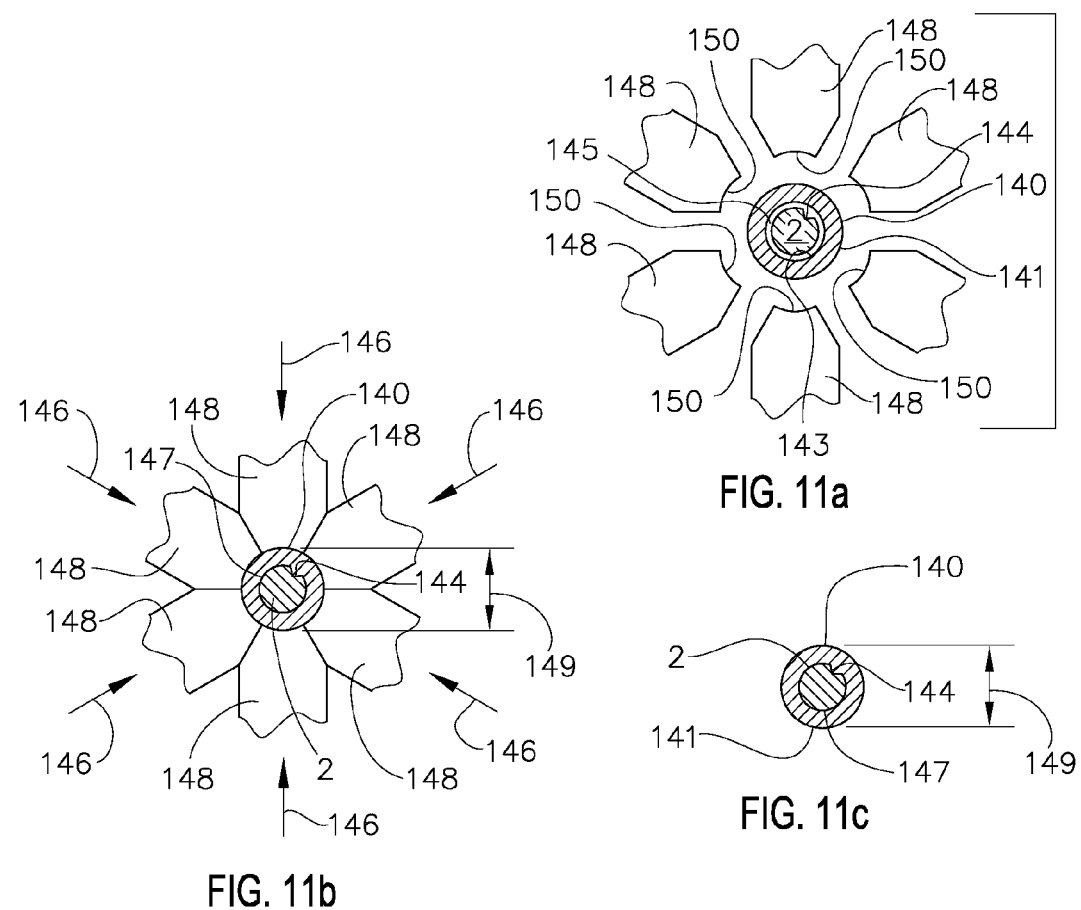

VEHICLE WHEEL SPOKE CONNECTION

CROSS-REFERENCE TO RELATED APPLICATION

This application is a Continuation-In-Part of U.S. patent application Ser. No. 12/806,064, filed Aug. 5, 2010, now U.S. Pat. No. 8,657,387 which is a Continuation-In-Part U.S. patent application Ser. No. 11/879,333, filed Jul. 17, 2007 and issued as U.S. Pat. No. 7,784,878, which is a Continuation-In-Part of U.S. patent application Ser. No. 10/755,653, filed Jan. 12, 2004 and issued as U.S. Pat. No. 7,357,460.

BACKGROUND OF THE INVENTION (1) Field of the Invention

The present invention relates to an improved connection system for a vehicle wheel spokes, particularly applicable to the spoke of a bicycle wheel.

(2) Description of the Related Art

Heretofore, the vast majority of bicycle wheels have been constructed using steel wire spokes with one headed end for connection with the bicycle hub and an opposing end that is directly threaded to accept a spoke nipple that engages the rim. By adjusting the threaded connection between the spoke and the nipple, the overall length of the spoke may be shortened or lengthened to create a balanced pretension in the spokes of the wheel.

Bicycle spokes serve as structural tensile elements where the tension of the spoke is resisted by the compression of the outer rim hoop to create a remarkably efficient wheel structure for handling the loads associated with the operation of the bicycle. The technology of conventional bicycle spokes has remained unchanged for the better part of a century.

Cyclists are continually striving to reduce the weight and increase the efficiency of their bicycle, especially rotating components such as the bicycle wheel. However, the steel spokes of conventional bicycle wheels are quite heavy and add significant weight to the wheel assembly.

In addition to their excessive weight, steel bicycle spokes have poor vibration-damping characteristics and tend to be very efficient at transmitting road vibration to the rider. By transmitting vibration, rather than absorbing it, the conventional steel-spoke bicycle wheel lacks in rider comfort and control.

In attempt to reduce weight, many makers of high-end wheels have resorted to forming their spokes from thinner gage steel wire. This causes the stress in the spoke to increase and makes the wheel more prone to spoke failure due to fatigue. The thinner steel wire has lower tensile stiffness, which can contribute to a reduced lateral stiffness of the wheel.

In the last 20 years, great strides have been made in the development of very lightweight materials that also have excellent tensile characteristics. Some of the most attractive of these materials include high-strength fibers, such as carbon fiber, aramid fiber, liquid crystal fiber, PBO fiber and the like. However, when attempting to utilize them as spokes in bicycle wheel construction, these fibrous materials are far more difficult to efficiently couple or terminate than their conventional steel-wire counterparts. In the few cases where these high strength spokes have successfully been utilized in bicycle wheels, their cost and complexity has been very great. This is the primary reason that the vast majority of bicycle wheels are still constructed using steel spokes.

Accordingly, it is an objective of the present invention to overcome the forgoing disadvantages and to provide a coupling or termination connection for a vehicle wheel spoke or tensile element that is strong, lightweight and inexpensive to produce.

An efficient connector coupling or termination should have a tensile strength that approximates the tensile strength of the lightweight tensile element and should not be so heavy as to detract from the weight benefit of these lightweight materials. In addition, cost is always a concern in the bicycle industry. These lightweight materials are often more expensive than the steel wire that they replace. An overly complex or expensive connector would make such a spoke to be cost prohibitive.

It is a further objective of the present invention to provide a construction as aforesaid which reduces cost and provides a wheel that is light in weight and high in strength and reliability.

Further objects and advantages of the present invention will appear hereinbelow.

SUMMARY OF THE INVENTION

In accordance with the present invention, it has now been found that the forgoing objects and advantages may be readily obtained.

The present invention comprises a spoke having an end portion and a cross-section thereof, a connecting element, a bracing element, and a tensile axis of applied tensile load along the span of the spoke. The connecting element is joined to the spoke by means of a crimped joinder where the connecting element, or a portion thereof, is plastically deformed to engage the spoke. The deformed connecting element is connected to the bracing element (i.e. the rim or the hub).

The connecting element may be made of a wide range of highly or moderately ductile metallic materials, including aluminum, magnesium, titanium, steel, brass, copper, among others. Other highly or moderately ductile materials may also be utilized, including fiber reinforced polymer among others. The connecting element may be formed by any of several fabrication methods known in industry, including molding, casting, forging, drawing, extruding, machining, among others. Also, it may be preferable to provide external geometry that may include a wide range of geometric features and surfaces, which may be easily optimized to provide a highly effective connection between the connector and the bracing element.

In a preferred embodiment, the connecting element includes threads to provide a means of threaded engagement between the connecting element and the bracing element. In a further preferred embodiment, the connecting element includes an overlying surface or edge to provide an overlie engagement between the connecting element and the bracing element. The connector may be connected to the bracing element either directly or indirectly through an intermediate connecting element. In a further preferred embodiment, the connector includes external geometry that allows it to be manipulated, either manually or with a mating tool. The connector also includes an internal cavity to accept the spoke. In a preferred embodiment, this internal cavity includes a configured surface and/or a smooth surface.

The spoke may be made of a number of different materials, including metallic materials such as aluminum, titanium, and/or steel wire. In an advantageous embodiment, the spoke includes high-strength reinforcement fibers. In a further advantageous embodiment, the reinforcement fibers are aligned to be parallel to the tensile axis. In a further advantageous arrangement, the fibers are at least 4 mm in length or are continuous and generally extend the length of the span. In a still further advantageous embodiment, the reinforcement fibers are encapsulated in a matrix. In a yet further embodiment, the matrix is at least one of a thermoplastic and a thermoset polymer resin matrix. Such fiber-reinforced spokes may have very high tensile properties at a much lower weight than conventional steel or metallic spokes, thus providing a significant weight savings to the wheel assembly. The spoke(s) may be produced by drawing, extruding, pultruding, machining, molding, forging, casting, among many other fabrication processes well known in industry. In a preferred embodiment, this spoke may include a configured surface and/or a smooth surface in the region where it interfaces with the connector.

The present invention obtains many advantages. One advantage of the present invention is the ability to utilize lightweight materials for the spoke while minimizing the cost and expense of the completed assembly.

The embodiments described herein represent a range of configurations wherein a connecting element (i.e. connector) is utilized to create an effective termination or coupling of a tensile element such as a bicycle spoke. The result is an improved assembly, including a means to connect the spoke with a bracing element, such as a hub or rim, to create a bicycle wheel that is exceptionally durable and light in weight.

The present invention may be readily adapted to lightweight fibrous materials including high-performance fibers, such as carbon fiber, aramid fiber (such as Kevlar®), LCP (liquid crystal fiber such as Vectran®), PBO (polyphenylenebenzobisoxasole) fiber such as Zylon®), polyethylene fiber (such as Spectra®) and the like. These materials may be of the dry-fiber form or they may be impregnated within a matrix. In any case, these materials represent a significant performance improvement over the steel spokes they replace. In comparison with the steel wire commonly used in spoke construction, these fibrous materials have equivalent or greater tensile strength than the steel spoke at a much lower density. This allows for the construction of a much lighter spoke and a lighter wheel. Further, these materials have significantly better vibration-damping characteristics for greater rider comfort and control. Still further, these materials also have excellent tensile fatigue properties to reduce or even eliminate spoke failures due to fatigue.

The embodiments described herein are highly effective at transmitting tensile loads between the spoke and the bracing element and may be designed to provide a connection that is as strong or stronger than the spoke itself. Further, the spoke and connector components may be produced through a variety of well-known and cost-effective processes that are capable of producing parts in high volume and at relatively low cost. Further, the crimping methods to join the spoke to the connector can also be achieved with highly manufacturable and cost effective processes Thus, the embodiments described herein are highly effective at producing a lightweight and high-performance vehicle wheel at an economical cost.

Further features of the present invention will become apparent from considering the drawings and ensuing description.

BRIEF DESCRIPTION OF THE DRAWINGS

The present invention will be more readily understandable from a consideration of the accompanying exemplificative drawings, wherein:

FIG. 2a is an axial plan view illustrating a prior art bicycle wheel;

FIG. 2b is a cross-section view of the prior art bicycle wheel as seen generally in the direction 15-15 of FIG. 2a;

FIG. 2c is a fragmentary view detailing the view illustrated in FIG. 2b where the hub flange is shown in a partial cross-section to illustrate the connection with the spoke;

FIG. 3b is a partial cross-section view of the bicycle wheel of FIG. 3a as seen generally in the direction 20-20 of FIG. 3a;

FIG. 4b is a partial cross-section view of the bicycle wheel of FIG. 4a as seen generally in the direction 169-169 of FIG. 4a;

FIG. 8a is a cross-sectional view of an additional embodiment of the present invention, taken perpendicular to the tensile axis, showing the connector surrounding the cross section of the spoke, prior to crimping of the connector;

FIGS. 8b-d are cross-sectional views of the embodiment of FIG. 8a, taken perpendicular to the tensile axis, and showing the progressive sequence of operations involved in creating a crimped connection between the spoke and the connector, including a punch and nest;

FIGS. 9a-c are partial cross-sectional views of an additional embodiment of the present invention, taken perpendicular to the tensile axis, and showing the progressive sequence of operations involved in creating a crimped connection between the spoke and the connector, including pinched folds in the connector;

FIGS. 10a-c are cross-sectional views of an additional embodiment of the present invention, taken perpendicular to the tensile axis, and showing the progressive sequence of operations involved in creating a crimped connection between the spoke and the connector, including non-circular and/or variable external geometry in the connector;

FIGS. 11a-c are partial cross-sectional views of an additional embodiment of the present invention, taken perpendicular to the tensile axis, and showing the progressive sequence of operations involved in creating a crimped connection between the spoke and the connector, including a multiplicity of punches;

DETAILED DESCRIPTION OF THE INVENTION

Figure 1:
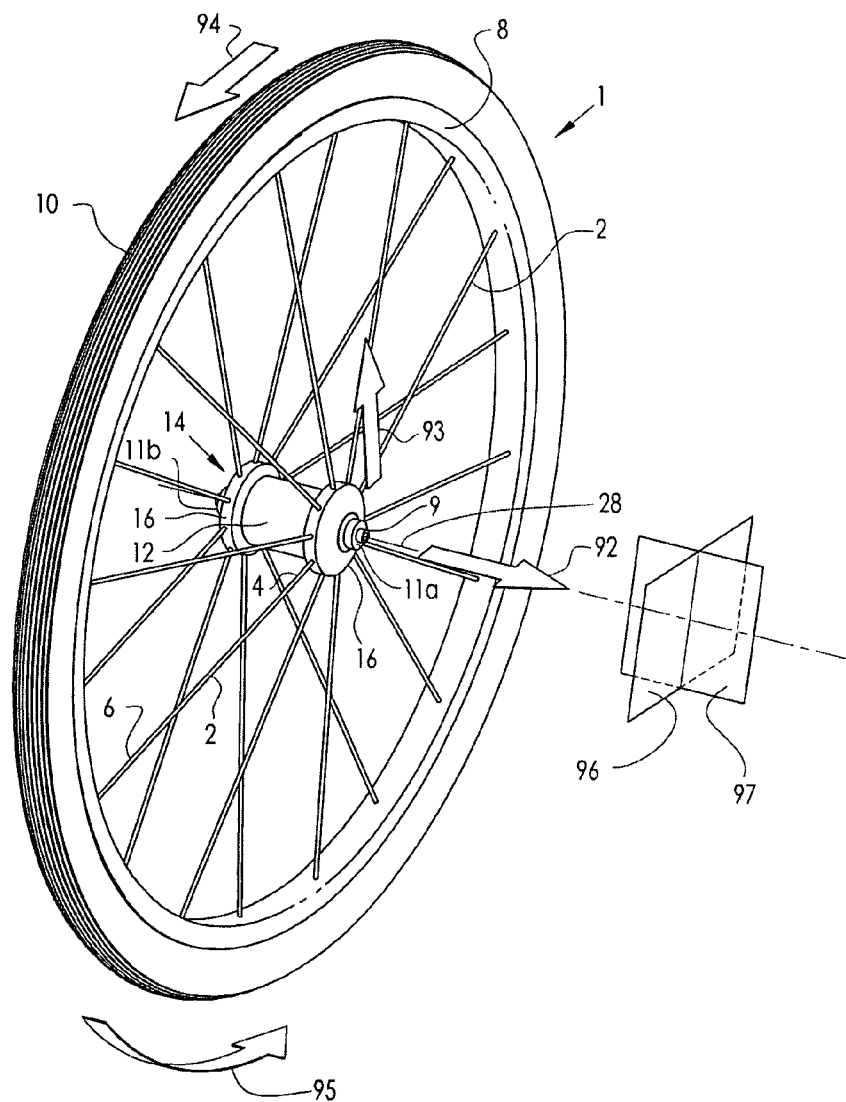
FIG. 1 is a perspective view schematically illustrating the general configuration of a prior art vehicle wheel as applied to a bicycle wheel.

FIG. 1 describes the basic configuration of an exemplary prior art vehicle wheel, in particular, a bicycle wheel 1, as well as a description of the direction conventions used throughout this disclosure. For clarity, the bicycle frame and the quick release skewer assembly are not shown in this figure. The hub shell 14 is rotatable about the axle 9 and includes at least two axially spaced hub flanges 16, each of which include a means for connecting with the spokes 2. Axle 9 includes end faces 11a and 11b that define the spacing of its mounting with the frame (not shown). The axial axis 28 is the axial centerline of rotation of the bicycle wheel 1. The hub flange 16 may be contiguous with the hub shell 14 or it may be separately formed and assembled to the hub body 12 portion of the hub shell 14. The spokes 2 are affixed to the hub flange 16 at their first end 4 and extend to attach the rim 8 at their second end 6. The tire 10 is fitted to the outer periphery of the rim 8. The wheel of FIG. 1 is generic and may be of tension-spoke or compression-spoke design.

The axial direction 92 is any direction parallel with the axial axis 28. The radial direction 93 is a direction generally perpendicular to the axial direction 92 and extending generally from the axial axis 28 radially outwardly toward the rim 8. The tangential direction 94 is a direction generally tangent to the rim at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 97 is a plane that is generally parallel to the axial axis. An orientation that is radially inboard (or inward) is nearer to the axial axis 28 of rotation and a radially outboard (or outward) is further from the axial axis. An axially inboard (or inward) orientation is an orientation that is axially proximal to the axial midpoint between the two end faces 11a and 11b. Conversely, an axially outboard (or outward) orientation is an orientation that is axially distal to the axial midpoint between the two end faces 11a and 11b. A radially inboard orientation is an orientation that is radially proximal to the axial axis 28 and a radially outboard orientation is an orientation that is radially distal to the axial axis 28. An axially inwardly facing surface is a surface that faces toward the axial midpoint between the two end faces 11a and 11b. Conversely, an axially outwardly facing surface is a surface that faces away from the axial midpoint between the two end faces 11a and 11b. While it is most common for the hub shell 14 to rotate about a fixed axle 9, there are some cases where it is desirable to permit the axle 9 to be fixed with the wheel 1 such as the case where the wheel 1 is driven by the axle 9.

For the purposes of using conventional terminology, the term "hub flange" is used herein to describe a region of the hub shell 14 to which the spokes 2 are joined. While the surface of the hub flange may be raised and flange-like in comparison to other surfaces of the hub shell 14, this is not a requirement for the present invention and the hub flange 16 may alternatively be flush or recessed relative to other hub shell surfaces.

It may be easiest to mold or otherwise form or fabricate the individual hub flanges 16 separately and then assemble these hub flanges 16, along with other components as required, such as the body portion 12, to create a complete hub shell 14. This hub shell 14 assembly may be permanent or else it may be removably assembled, allowing the hub flange 16 to be disassembled from the other portions of the hub shell 14 for servicing in the field. However, it is also anticipated that the hub shell 14, including the body portion 12 and a multiple of hub flanges 16, may be molded or formed together as a unit.

As is well known in the art, a wheel 1 may be of tension-spoke construction, where the central hub hangs in tension by the spokes from the rim portion directly above, or it may be of compression-spoke construction, where the hub is supported by compressing the spoke directly beneath it. Since the present invention may be directed toward bicycle wheels and since the tension-spoke wheel is generally a more efficient structure than compression-spoke wheel, most of the discussion herein is focused with an eye toward tension-spoke wheel construction. However, it is anticipated that most, if not all, of the embodiments of the present invention may be adapted or otherwise applied to compression-spoke wheel construction as well. For a tension-spoke wheel, it is preferable that the wheel includes at least two hub flanges that are axially spaced on either side of the rim or, more specifically, the spoke attachment points at the rim. Thus the spokes fixed to opposite hub flanges will converge as they extend to the rim as illustrated in FIG. 2b. Additionally, a tension-spoke wheel will usually be pretensioned during assembly to create a pretensioned structure of balanced spoke tension that allows the axle supporting loads to be distributed among several, if not all, of the spokes of the wheel. It is this ability to share the stresses among its spokes that helps to make the tension-spoke wheel the highly efficient structure that it is. For a compression-spoke wheel, it is often preferable to employ at least two axially spaced hub flanges, however, in the case where the spokes have sufficient bending stiffness to support the requisite lateral loads, only a single hub flange may be employed.

FIGS. 2a, 2b and 2c describe the current technology in conventional bicycle wheels that most cyclists are familiar with. This prior art design includes a rim 8, a hub shell 14 and a plurality of spokes 2. The hub shell 14 is rotatable about the axle 9 and includes a pair of axially spaced hub flanges 16. The wheel is assembled by first threading each individual spoke 2 through an axial hole 17 in the hub flange 16 until the j-bend 19 is hooked within the hole 17. The spoke 2 is then pivoted to extend in a generally radial direction toward the rim 8. The enlarged portion 34 or "head" of the spoke 2 prevents the spoke 2 from pulling through the hole 17 in the hub flange 16. The second end 6 of each spoke 2 is then fixed to the rim 8 via spoke nipples 21. Tightening the threaded engagement between the spoke nipple 21 and the spoke 2 serves to effectively shorten the length of the spoke 2. Thus, as the nipples 21 are threadably tightened, the spokes are drawn up tight and a degree of pre-tension is induced in the spoke 2. By selectively adjusting this threaded engagement, the spoke pre-tension may be adjusted to align the trueness of the rim 8. The spoke pre-tension is resisted by circumferential compression of the rim 8 and it is this balance of forces that imparts efficient structural integrity to the bicycle wheel 1. Also shown in FIG. 2b is bracing angle 38 between the radial centerline plane of the rim 8 and the tensile axis 36 of the spokes 2. As this bracing angle 38 is increased, the lateral stiffness (i.e. stiffness in the axial direction 92) of the wheel 1 is also increased.

Figure 3A:
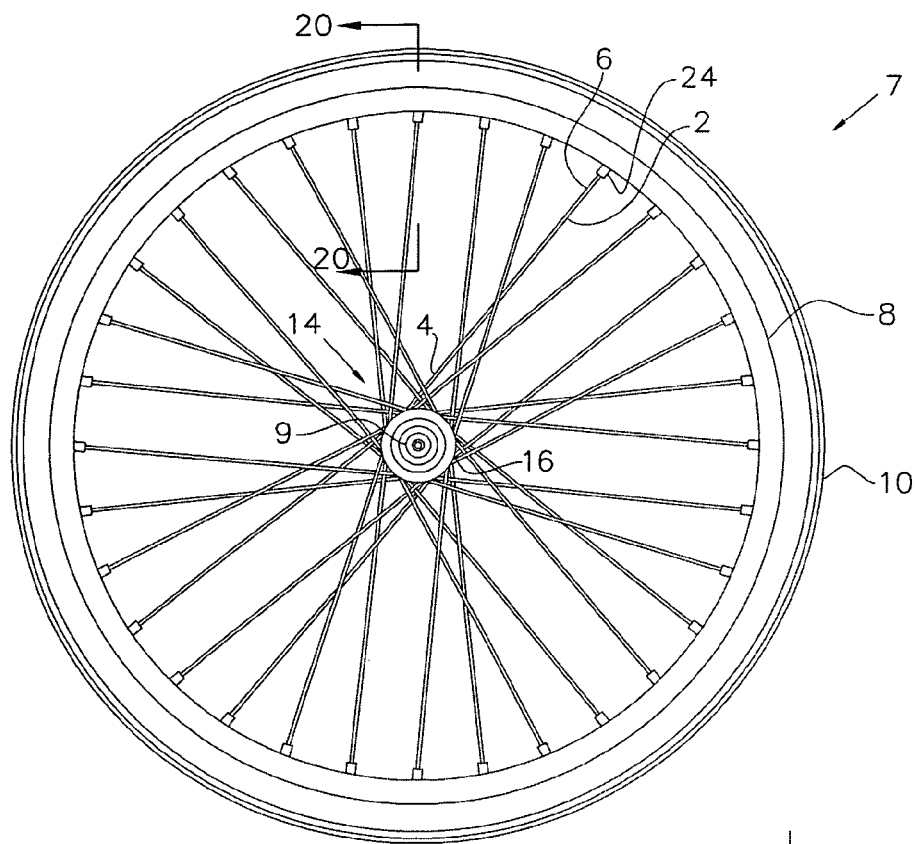
FIG. 3a is a plan view of an embodiment of the present invention, illustrating a bicycle wheel including collars or connecting elements, each serving as a termination for the corresponding spoke.

FIG. 3a shows an exemplary bicycle wheel 7 that corresponds to some of the embodiments described herein. This figure is shown to provide a generic assembly to illustrate an arrangement wherein the present invention may be adapted to utilization in bicycle wheel construction. The bicycle wheel 7 includes spokes 2, hub 14, rim 8, and tire 10. The hub 14 includes hub flanges 16 and axle 9. The rim 8 includes geometry for mounting of a tire 10 and a multiplicity of spoke holes 22 in its spoke bed wall 33, each to accept an individual connector 24. It is noted that the rim 8 shown here is an exemplary representation of a bracing element that may serve as a rim or a hub flange and may take on a wide range of forms. The spokes 2 are preferably constructed of fiber-reinforced material and are connected at their first end 4 to their associated hub flange 16 and at their second end 6 to the rim 8. The spoke 2 is a long slender tensile element with a longitudinal axis 26 along its length and generally parallel to its sidewalls. The spoke 2 also has a tensile axis 36 of applied tensile load, which is generally collinear to the longitudinal axis 26. For the purposes of definition, the term "longitudinal" herein refers to alignment along the longitudinal axis.

Figure 3B:
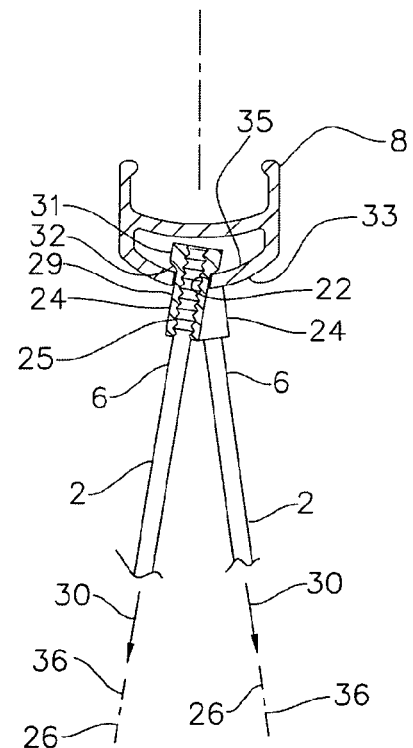

To create a solid connection between the spoke 2 and the rim 8, the second end 6 of each fiber reinforced spoke 2 is first connected to a corresponding connector 24 by means of an crimped connection at an engagement interface 25 as described variously within the instant disclosure. The connector 24 is crimped to the second end 6 of the spoke 2 by means of one of the embodiments of the present invention. The connector 24 includes a shank portion 29, a head portion 31, and a transition surface 32 therebetween as shown in FIG. 3b, which is a detail view of the embodiment described in FIG. 3a and shows the rim 8 in cross-section. As shown in FIG. 3b, shank portion 29 extends through spoke hole 22, with transition surface 32 serving as an engagement surface to bear against the radially outboard surface 35 of the spoke bed wall 33 in an overlie engagement, which provides blocking engagement to resist spoke tension 30. It should be noted that, the transition surface 32 provides engagement geometry to engage the connector 24 to the bracing element (rim 8).

The connector 24 of FIGS. 3a-b is generally shown to serve as a termination to the spoke 2 and provide means to connect or anchor the spoke to a bracing element (i.e. rim 8). Note that the span of spoke 2 is aligned in the direction of spoke tension 30 and along the tensile axis 36, which extends through the longitudinal axis 26 of the spoke 2. FIG. 3a shows that several spokes 2 of the wheel 7 may be terminated at the rim 8 in this manner. The connector 24 may alternatively be connected to the first end 4 of the spoke 2 for connection to the hub 14. For simplicity in describing this embodiment, a rim 8 connection arrangement is shown herein, with the understanding that such an embodiment may be easily adapted to hub connections as well.

It is understood that FIGS. 3a-b correspond to a simplified arrangement for illustration purposes. Several of the embodiments of the present invention may be applied to this arrangement, as well as arrangements which include facility for creating and/or adjusting spoke pre-tension, as described in FIGS. 2a-c.

The present invention comprises a spoke, which may be considered as a longitudinal tensile element having an end portion and a cross-section thereof, a connecting element, a bracing element, and a tensile axis of applied tensile load along the longitudinal tensile element. The longitudinal tensile element is connected to the connecting element by means of a crimped joinder between the longitudinal tensile element and the connecting element. In the embodiments shown herein, the longitudinal tensile element is a vehicle wheel spoke 2, the hub flange 16 constitutes a first bracing element and the outer rim 8 constitutes a second bracing element.

A spoke is a generally long slender element, with a length greater than its cross sectional width, and with a longitudinal axis extending generally along its length. The longitudinal tensile element (i.e. spoke) includes external sidewall surface(s) that extend generally along its length. As such, the longitudinal axis is generally parallel to the sidewall surface. The tensile axis is the axis along which tensile loads are applied to the tensile element, and is commonly collinear with the longitudinal axis, particularly in the region of the structural span of the longitudinal tensile element. For the purposes of explanation herein, the term "longitudinal axis" is generally interchangeable with the term "tensile axis", unless otherwise noted. Some examples of a longitudinal tensile element include the spoke of a vehicle wheel, a guy wire, a control cable, or a tendon. In most of the embodiments of the present invention, the longitudinal tensile element is capable of supporting tension, otherwise known as positive tensile loading, along its length. However, the tensile element may alternatively support compression, otherwise known as negative tensile loading, along its length, where the longitudinal tensile element provides columnar support between two bracing elements. The spoke span is considered as the portion of the spoke that is under tension and that extends between its anchor points and/or engagements at the bracing elements (i.e. hub and rim). A location outboard of the spoke span is a location along the tensile axis that is beyond or external to the spoke span.

The spoke has longitudinal external sidewall surface(s) that may be generally parallel to the longitudinal axis and an end face that is generally perpendicular to the sidewall surface. With a slender spoke, the sidewall tends to have far greater available surface area than its end face. Since an engagement interface of greater surface area tends to provide a more robust connection, it is often preferable to provide an engagement interface that extends longitudinally along the sidewall surface and preferably by a longitudinal length at least twice the cross sectional thickness of the spoke. This is in contrast to conventional spoke arrangements that focus these loads on a small point of contact, as with conventional prior art wheel assemblies.

It may be termed that a longitudinal engagement is an engagement that includes a continuous longitudinal engagement interface or an engagement that includes at least two engagement interface locations that are longitudinally spaced along the longitudinal axis of the spoke. It is generally desirable that the longitudinal length of such an engagement be greater than the cross-sectional thickness of the spoke to create an effective engagement. Obviously, increasing the length of engagement will increase the interface surface area and will therefore increase the load carrying capacity of the crimped joinder between the connector and the spoke.

Since a longitudinal engagement may reduce the contact stresses at the engagement interface where the connector and the spoke are joined, this type of engagement is particularly applicable to bracing elements and/or spokes of polymer or reinforced polymer materials. This is particularly advantageous, since these materials tend to have high strength and light weight. However, heretofore these materials have been difficult to apply to conventional spoke connection systems that are generally focused on construction based on metallic materials. While the spokes described in the present invention may be constructed from a variety of materials, including a wide range of metallic materials and polymeric materials, one particularly advantageous aspect of the present invention is its ability to provide a termination means for a spoke of fiber reinforced polymer material.

In order to take advantage of the lightweight and high strength of the high-performance fibers mentioned hereinabove, it may be preferable to incorporate these material(s) in the spoke. These materials tend to be anisotropic and have greater strength along the direction of the fiber. Thus it may be preferable that these fibers are aligned to be parallel to the tensile axis. It is also preferable that these reinforcement fibers be encapsulated in a matrix. While short or discontinuous fibers often provide significant reinforcement to the matrix material, it is preferable that the fibers be as long as possible to provide the greatest overlap with adjacent fibers.

The utilization of continuous fibers that extend generally along the length of the spoke provides the highest mechanical properties.

A spoke of high strength fibers in a resin matrix has numerous advantages in the present invention. Firstly, the resin matrix adheres the adjacent fibers to each other so that, through a joinder to the external surface of the spoke, the overmolded interface has a connection with all of the fibers of the spoke, which permits the fibers to work together for optimal tensile properties. Further, the resin matrix coats the outside of the pre-formed spoke, which creates an optimal surface for joinder with the connector at the engagement interface.

A bracing element is one that resists or braces against all or part of the load of a tensile element. In other words, in order for a tensile element to maintain its tension (or compression) and remain a generally static structure, it must have a resisting or bracing element to bear against. Thus, the tensile element is generally anchored to two bracing elements and the tensile element thereby serves to connect the two bracing elements to each other. In an example where the tensile element is generally held in tension, such as the spoke of a tension-spoke vehicle wheel, a first bracing element could be the hub flange and a second bracing element could be the outer rim hoop. Similarly, in the case where the tensile element is generally held in compression, such as the spoke of a compression-spoke vehicle wheel, the bracing element is that element which the tensile element is pushed against.

In the descriptions provided herein, the term "coupling" identifies an arrangement where a connecting element serves to provide a structural connection between two tensile elements (i.e. spokes), thus permitting tensile loads to be transmitted from one tensile element to another. A coupling may be considered to provide a connection within the span portion of the spoke or to couple together two spoke portions. In contrast, the term "termination" or "anchor" identifies a connecting element that serves to provide a means to connect the tensile element (i.e. spoke) at the terminus of its span, either directly or indirectly, to a bracing element (i.e. the hub or rim), to which the tensile element is intended to be anchored.

Figure 4A:
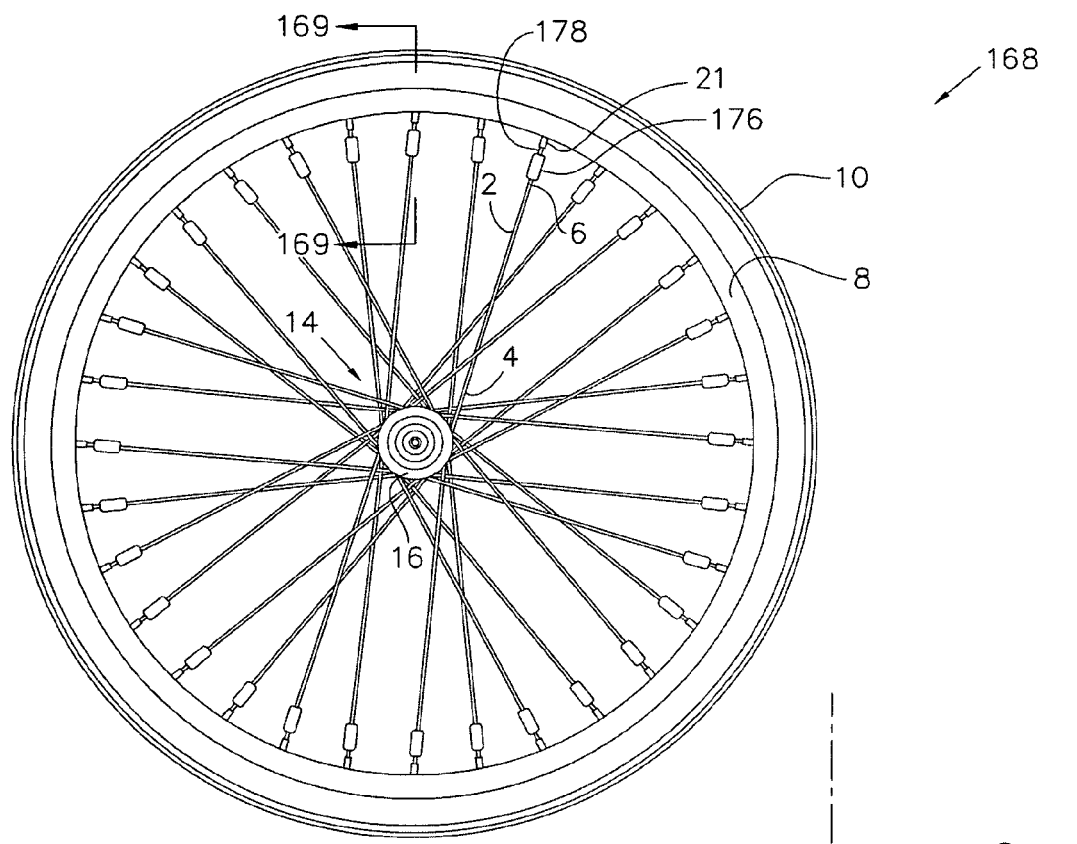
FIG. 4a is a plan view of another embodiment of the present invention, illustrating a bicycle wheel including coupling collars or connecting elements, each serving as a coupling for the corresponding spoke.
Figure 4B:
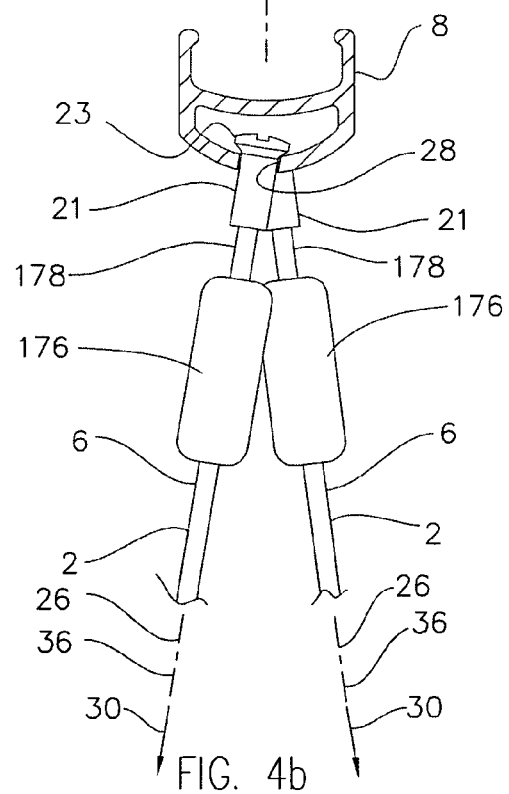

FIGS. 4a-b shows a bicycle wheel 168 similar in most respects to the bicycle wheel 7 of FIGS. 3a-b. However, the connector 24 is eliminated in favor of coupling collar 176 and fastener 178. The spokes 2 are connected at their first end 4 to the hub 14 and at their second end 6 to coupling collar 176. To create a solid connection between the spoke 2 and the rim 8, the second end 6 of the spoke 2 is first connected to a threaded fastener 178 by means of a coupling collar 176. The threaded fastener 178 is threadably mated to a spoke nipple 21 to connect with the rim 8 in the conventional manner. Spoke nipple 21 is generally conventional and includes an enlarged head portion 23. It may be seen that the coupling collar 176 serves as a coupling element to join together two tensile elements (i.e. the spoke 2 and the fastener 178). The tire 10 is mounted to the rim 8 in the conventional manner. FIG. 4a shows that all of the spokes of the wheel 168 may be connected at the rim 8 in this manner. The coupling collar 176 and the fastener 178 may alternatively be connected to the first end 4 of the spoke 2 for connection to the hub 14. In such a case, the fastener 178 may be connected to the hub via spoke nipples 21 or it may be directly threaded into mating holes of the hub flange 16. Such an arrangement where the spoke 2 is threadably connected directly to the hub flange is well known in industry. For simplicity in describing the present invention, only rim 8 connection arrangements are shown herein, with the understanding that these embodiments may be easily adapted to hub connections as well.

FIG. 4b is a detail of the embodiment described in FIG. 4a and shows the rim 8 in cross-section. The spoke nipple 21 is fitted through hole 28 in the rim 8 and is retained in place by the head portion 23. The nipple 21 is of conventional configuration and includes a female threaded central bore that is mated to the male threaded fastener 178. Thus, spoke pretension may be adjusted for each individual spoke by threadably tightening the nipple 21 on the fastener 178, effectively shortening the spoke 2 to induce tension to the spoke 2. Note that the span of spoke 2 is aligned in the direction of spoke tension 30, including a tensile axis 36 that is aligned in the direction of spoke tension 30 and extends through the longitudinal axis 26 of the spoke 2. The connection between the spoke 2 and the fastener 178

Figure 5A:
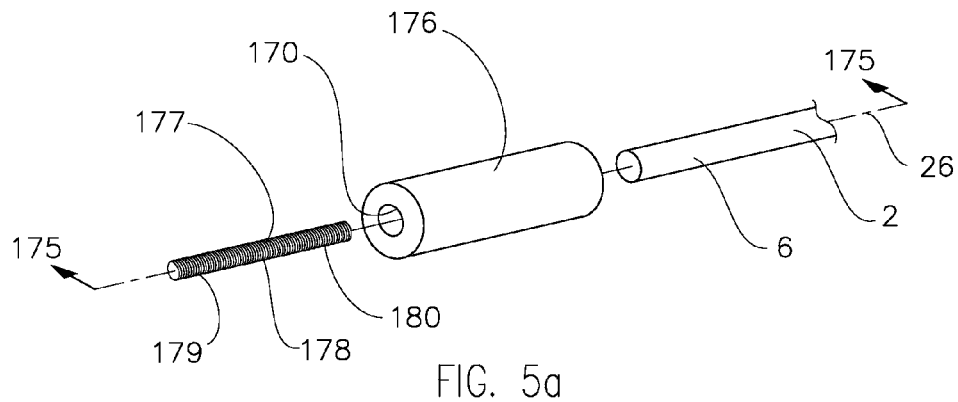
FIG. 5a is a partial perspective exploded view of an additional embodiment of the present invention, in exploded assembly, with the connector serving as a coupling between two tensile elements, shown prior to the crimped assembly.

FIGS. 5a-e provides an exemplary joining means corresponding to the embodiment of FIGS. 4a-b and describes how the coupling collar 176 may be plastically deformed to grip both a fastener 178 and the second end 6 of a spoke 2. As shown in FIG. 5a, threaded fastener 178 includes first end 180 and second end 179 and external threads 177 on its outer surface as shown. External threads 177 may be considered as a configured external surface of the threaded fastener 178.

Figure 5B:
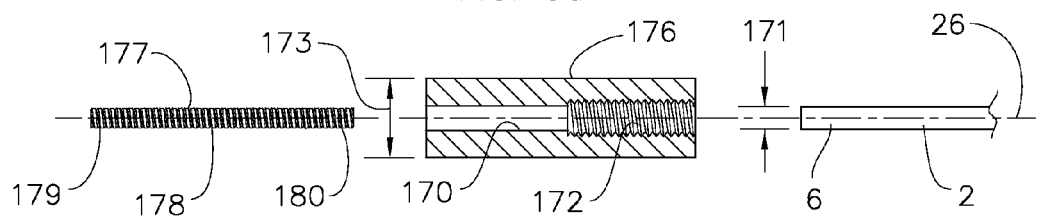
FIGS. 5b-d are partial cross-sectional views, taken along the tensile axis, and showing the embodiment of FIG. 5a in a sequence of operations involved in creating a connector assembly, including a crimped coupling collar.
Figure 5C:
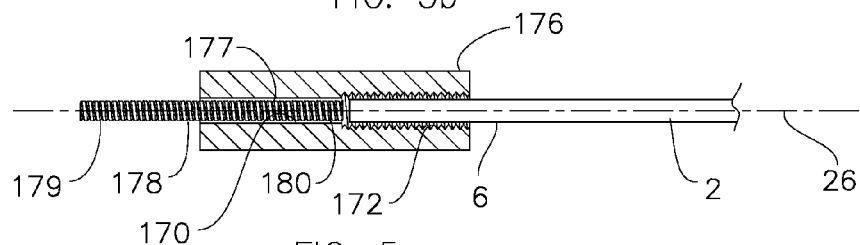

Spoke 2 is shown here to be generally round in cross-section and includes second end 6 and longitudinal axis 26. As shown in FIG. 5b, coupling collar 176 includes a smooth internal cavity 170 that is sized to provide a clearance fit with the outer surface of fastener 178. At its opposite end, coupling collar 176 includes a knurled or internally threaded hole 172 whose inside diameter is sized to provide a close clearance fit with the outside diameter 171 of the spoke 2. The knurled or internally threaded hole may be considered as a cavity with a configured internal surface. Cavity 170 is preferably collinear with hole 172. Coupling collar 176 also includes an external dimension 173. In the pre-assembly described in FIG. 5c, the first end 180 of fastener 178 is positioned in cavity 170 and the second end 6 of spoke 2 is positioned in hole 172.

Figure 5D:
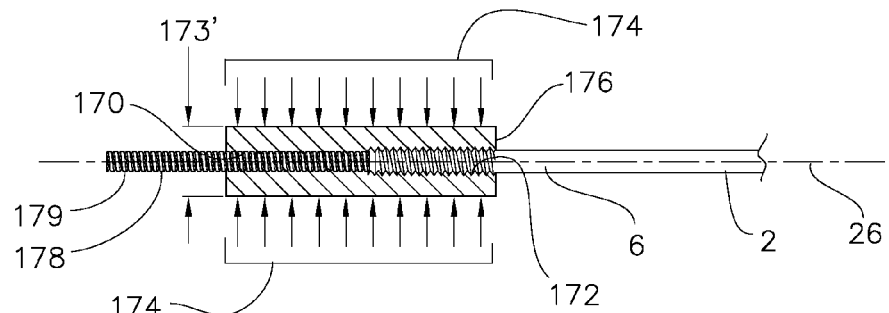
Figure 5E:
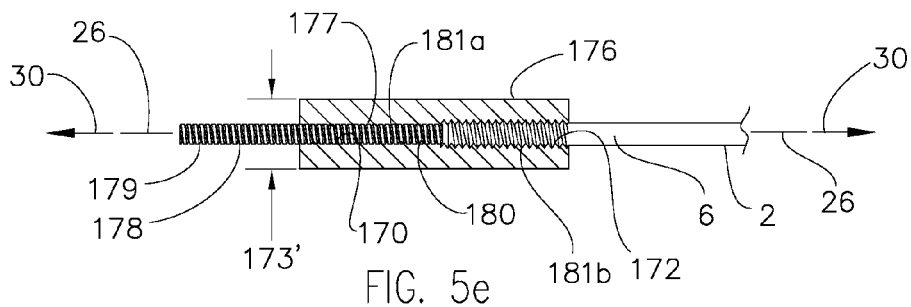
FIG. 5e is a partial cross-sectional view, taken along the tensile axis, and showing the embodiment of FIG. 5d, including applied tensile load between the spoke and fastener.

The coupling collar 176 is then swaged or crimped or otherwise deformed as shown in FIG. 5d where external crimping forces 174 are applied to the outside of the coupling collar 176. External forces 174, associated with the crimping or swaging processes, serve to press, deform and shrink the coupling collar 176 to a reduced external dimension 173', thereby shrinking cavity 170 into intimate contact-with the first end 180 of the fastener 178 and shrinking hole 172 into intimate contact with the second end 6 of the spoke 2. As shown in FIG. 5d, when cavity 170 is shrunk onto fastener 178, the external threads of fastener 178 are pressed to impinge the walls of cavity 170, causing the cavity 170 to be embossed or plastically deformed to conform and mate with the external threads of fastener 178 at an engagement interface 181a. The interlocking and gripping engagement at engagement interface 181a is a longitudinal engagement that occurs over a length along the longitudinal axis as shown. Simultaneously, when hole 172 is shrunk onto the second end 6 of spoke 2, internal threads of hole 172 impinge the spoke 2 such that the spoke 2 is embossed and plastically deformed to conform and mate with the internal threads of hole 172 at an engagement interface 181b. The interlocking and gripping engagement at engagement interface 181b is also a longitudinal engagement that occurs over a length along the longitudinal axis as shown. Coupling collar 176 now has an interlocked and overlying engagement that mates and grips both the fastener 178 and the spoke 2 and an effective tensile connection is thereby achieved to support spoke tension 30 as shown in FIG. 5e. Coupling collar 176 may thus be considered a coupling that joins two tensile elements (i.e. fastener 178 and spoke 2).

A configured surface is defined herein as a region of variable surface geometry that usually includes raised surface(s) and adjacent recessed surface(s). Some examples of configured surfaces include surfaces that are threaded, knurled, ribbed, headed, raised, indented, warped, bent, etc. In this case, the external threads 177 may be considered as a configured surface, consisting of raised helical crests interspersed with relieved helical roots, which may also be viewed as a series of longitudinally spaced alternating raised surfaces and relieved surfaces projecting laterally from the sidewall of the spoke 2. Similarly, the internal threads of threaded hole 172 may be considered as a configured surface. The external threads of fastener 178 and the internal threads of hole 172 may be easily and economically produced using conventional tooling, but these threads are merely representative of configured embossing surfaces. Other configured surfaces may be substituted.

The embossed engagement between internal threads of hole 172 and spoke 2 and between external threads 177 and cavity 170 are effective to prevent relative movement between the fastener 178, the coupling collar 176, and the spoke 2 along the longitudinal axis 26. However, these embossed engagements rely only on friction to prevent relative rotation or unscrewing between these three components. To prevent such rotation and/or unscrewing, it is anticipated that the external threads 177 and/or internal threads of threaded cavity 170 include non-circular geometry (not shown) prior to crimping, such as a notch or distortion of these threads. Thus, the resulting engagement interfaces 181a and 181b will also include noncircular geometry such that these three components are rotationally keyed and locked to each other to prevent unscrewing.

While it may be beneficial to have an embossed engagement between the coupling collar 176 and the fastener 178 and/or the spoke 2, it is also envisioned that hole 172 and the second end 6 of spoke 2 may alternatively be smooth surfaces. In such a case, when the coupling collar 176 is shrunk as previously described, a frictional gripping engagement is created between the coupling collar 176 and the spoke 2.

Based on the deformation involved in this embodiment, it is desirable that the coupling collar 176 be made of a material whose hardness falls somewhere between the hardness of the fastener 178 and the hardness of the spoke 2. Fastener 178 is of greater hardness than coupling collar 176 and coupling collar 176 is of greater hardness than the second end 6 of spoke 2. It is generally understood that in most circumstances, when a softer material is pressed against a harder material, it is the softer material that will deform against a harder material. For example, the fastener 178 may be of stainless steel material and the coupling collar 176 may be of aluminum alloy and the second end 6 of the spoke 2 may be of fiber-reinforced polymer, including reinforcement fibers 85. Stainless steel has greater hardness than aluminum alloy and aluminum alloy has greater hardness than fiber reinforced polymer.

It should be understood that plastic deformation involves the yielded deformation of a material due to pressure or load. This is in contrast to elastic deformation, in which the material springs back to its original shape when the applied pressure or load is removed. It may be considered that a the coupling collar 176 is made of a malleable or ductile material that exhibits at least some degree of plastic deformation when it is pressed by crimping forces 174 as described in FIG. 5d. Similarly, the second end 6 of spoke 2 is made of malleable or ductile material such that it is deformed when pressed by the coupling collar 176.

In addition to the description of FIGS. 5a-e, the term "crimp" or "crimped joinder" is used throughout this disclosure to refer to the process of pressing a malleable or ductile connecting element (i.e. coupling collar 176) to plastically crush, shrink or reduce at least one of its dimensions. This may be achieved through a range of processes, such as crimping or swaging that are well known in industry. Most commonly the connecting element includes an external surface and an internal cavity (i.e. cavity 170 and threaded hole 172). This crimping process involves pressing and plastically shrinking a dimension of the external surface of the connecting element to induce the shrinkage of a corresponding dimension of the internal cavity. Through this shrinkage of the internal cavity, the connecting element may be engaged to the spoke.

Figure 6A:
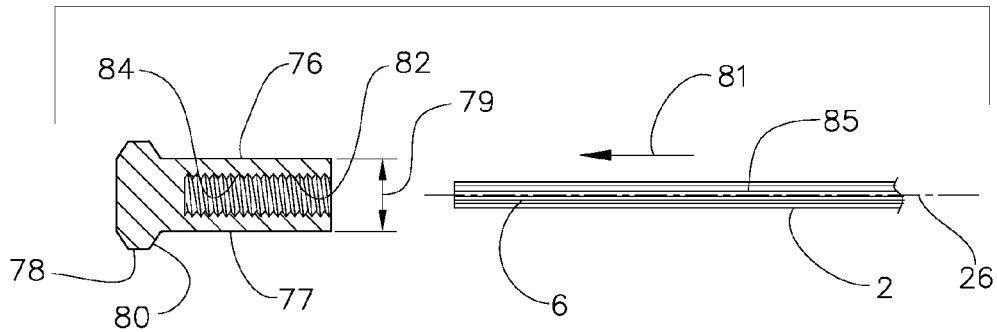
FIGS. 6a-b are partial cross-sectional views of an additional embodiment of the present invention, taken along the tensile axis, with the connector serving as a termination for a tensile element, and showing the sequence of operations involved in creating a crimped connection between the spoke and connector.
Figure 6B:
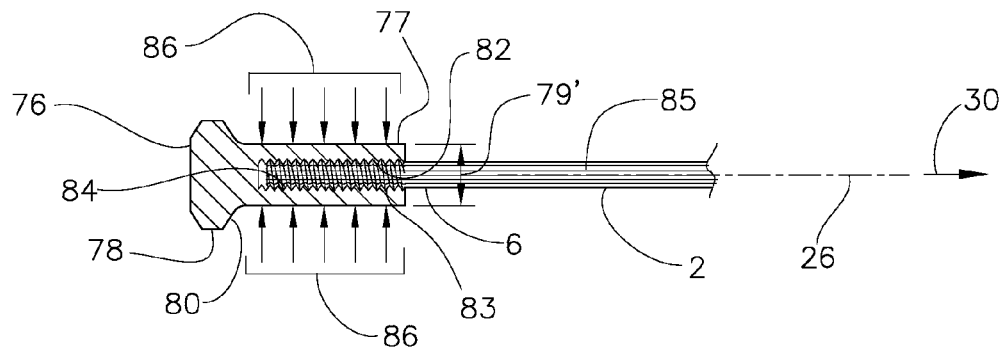
Figure 6C:
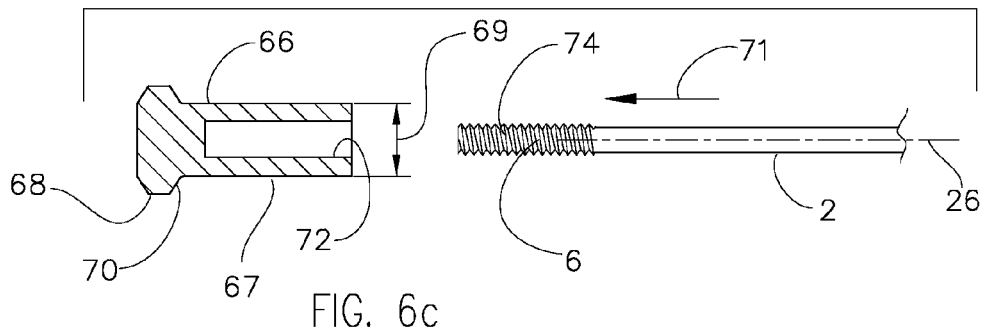
FIGS. 6c-d are partial cross-sectional views of an additional embodiment of the present invention, taken along the tensile axis, with the connector serving as a termination for a tensile element, and showing the sequence of operations involved in creating a crimped connection between the spoke and connector.
Figure 6D:
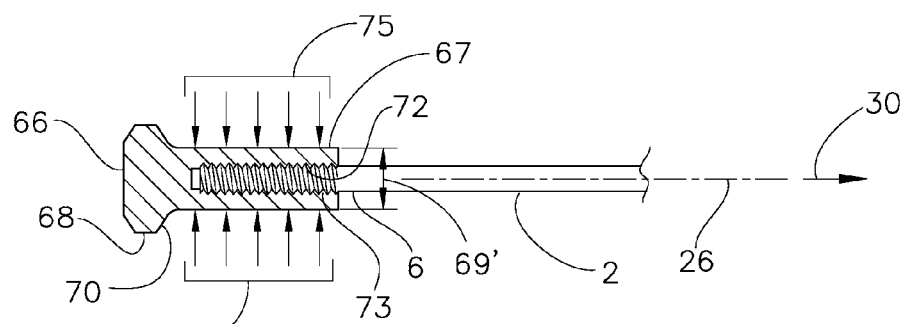

The embodiment of FIGS. 6a-b and the embodiment of FIGS. 6c-d both describe an exemplary joining means corresponding to the embodiment of FIGS. 3a-b and describes how a connector may be crimped and plastically deformed to grip the second end 6 of a spoke 2. As shown in the embodiment of FIGS. 6a-b, connector 76 includes a shank portion 77 with external dimension 79 and an enlarged head portion 78 with a transition surface 80 therebetween. Connector 76 also includes a blind cavity or hole 82 with a configured internal surface consisting of internal threads 84. Spoke 2 is shown here to be generally round in cross-section and includes longitudinal axis 26 and second end 6, which is sized to have a clearance fit with hole 82. As shown in FIG. 6a, the second end 6 is first aligned with hole 82. Next, the spoke 2 is inserted into hole 82 in direction 81 and positioned such that the connector 76 overlaps the spoke 2 along the longitudinal axis 26 to create a pre-assembly between the spoke 2 and the connector 76.

The connector 76 is made of a harder material, such as aluminum and the spoke 2 is made of a softer material, such as fiber reinforced polymer. Thus the softer spoke 2 may be deformed to conform to the harder connector 76. It is further anticipated that the surface of the spoke 2 may include a coating of softer material that will serve as a readily deformable layer such that this layer will be more easily be deformed upon impingement by the connector 76. In an exemplary arrangement, the spoke 2 may be made of thermoplastic polymer resin with continuous carbon reinforcement fibers 85 that extend through the entire length of the spoke 2 and with a resin-rich external surface.

Next, as shown in FIG. 6b, the connector 76 is crimped onto the spoke 2 with external crimp force 86 applied to press the shank portion 77 of the connector 76 in a direction perpendicular to the longitudinal axis 26 to cause the shank portion 77 to plastically deform and shrink to a reduced external dimension 79'. This deformation of the shank portion 77 causes the blind hole 82 to shrink such that the harder internal threads 84 press and impinge the second end 6 of the spoke 2 such that the softer ductile second end 6 is embossed and deformed (both plastically and elastically) to conform to the contour of internal threads 84. Thus, spoke 2 is has an overlie engagement with the internal threads 84 and is also gripped by the connector 76 at engagement interface 83 to securely join the connector 76 to the spoke 2 and to prevent relative movement between the two along the longitudinal axis 26. Engagement interface 83 may be considered a longitudinal engagement interface as it occurs over a longitudinal length of the spoke 2. The connector 76 may then be connected to the rim 8 as described in FIGS. 3a-b or may alternatively be connected to the hub. Connector 76 may thus be considered a termination that provides anchoring at the end of the spoke 2 to resist spoke tension forces.

As shown in the embodiment of FIGS. 6c-d, connector 66 includes a shank portion 67 with external dimension 69 and an enlarged head portion 68 with a transition surface 70 therebetween. Connector 66 also includes a blind cavity or hole 72 with generally smooth internal walls as shown. Spoke 2 is shown here to be generally round in cross-section and includes longitudinal axis 26 and second end 6 with a configured external surface consisting of external threads 74 which are sized to have a clearance fit with hole 72. As shown in FIG. 6c, the second end 6 is first aligned with hole 72. Next, the spoke 2 is inserted into hole 72 in direction 71 and positioned such that the connector 66 overlaps the spoke 2 along the longitudinal axis 26 to create a pre-assembly. The connector 66 is made of a softer material, such as aluminum and the spoke 2 is made of a harder material, such as steel.

Next, as shown in FIG. 6d, the connector 66 is crimped onto the spoke 2 with external crimp force 75 applied to press the shank portion 67 of the connector 66 to cause the shank portion 67 to plastically deform and shrink inwardly. This deformation of the shank portion 67 causes the blind hole 72 to shrink such that the harder external threads 74 of the spoke 2 press and impinge the generally smooth walls of the blind hole 72 such that the softer ductile blind hole 72 is deformed to conform to the contour of external threads 74. Thus, connector 66 has an overlie engagement with the external threads, with spoke 2 also gripped by the blind hole 72 at engagement interface 73 to securely join and lock the connector 66 to the spoke 2 and to resist spoke tension loads. The connector 66 may then be connected to the rim 8 as described in FIGS. 3a-b or may alternatively be connected to the hub.

It should be noted that for description purposes, internal threads 84 and external threads 74 are shown to be generally conventional helical thread forms, which are shown here as representations of a configured (non-smooth) surface. Alternatively, any manner of configured surface may be substituted, such as knurling, etc. Further, it may also be preferable to deform or notch the helical thread form described herein such that the deformed engagement provides resistance to twisting between the connectors (66, 76) and their corresponding spoke 2 about the longitudinal axis 26.

In reviewing the embodiments of FIGS. 6a-b and 6c-d, as well as several other embodiments described herein, it may be seen that, during crimping, the softer one of the spoke and connector may deform to conform to the configured surface of the harder one of the spoke and connector such that, upon the crimped shrinking of the connector, the softer component now has a series of longitudinally spaced alternating raised surfaces and relieved surfaces that are nested and matched with the corresponding surfaces of the harder component. These nested and matched surfaces constitute a series of interlocking mechanical overlie engagements between the spoke and the connector to lock the connector to the spoke in a direction along the longitudinal axis so that the resultant joinder may resist spoke tension 30. The series of mechanical overlie engagements are preferably arranged generally along the longitudinal axis 26 of the spoke as shown to serve as a longitudinal engagement as previously described and to provide a more robust joinder between the connector and the spoke. Thus, the connector is solidly locked and joined to the spoke to support spoke tension 30. It is understood that the configured surface is also merely representative of a wide range of spoke cross section and surface geometries, both constant and variable along the longitudinal axis 26, that may be utilized to enhance the performance and design of the spoke/connector joinder. For example, the configured surface may be knurled, notched, threaded, flattened, fluted, ribbed, necked, headed and/or tapered, among other geometries. Further, it is also envisioned that one or both of the spoke and connector may include matched non-circular cross section geometry such that the connector and spoke may be keyed to each other to prevent or limit independent rotational movement about the longitudinal axis.

Figure 7A:
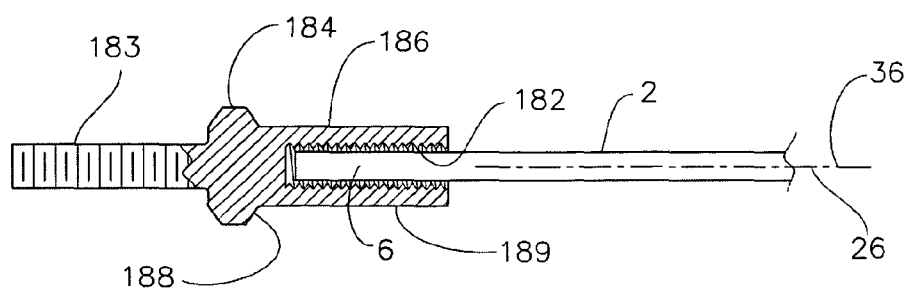
FIGS. 7a-b are partial cross-sectional views of an additional embodiment of the present invention, taken along the tensile axis, with the connector including an integral fastener portion, and showing the sequence of operations involved in creating a crimped connection between the spoke and connector.
Figure 7B:
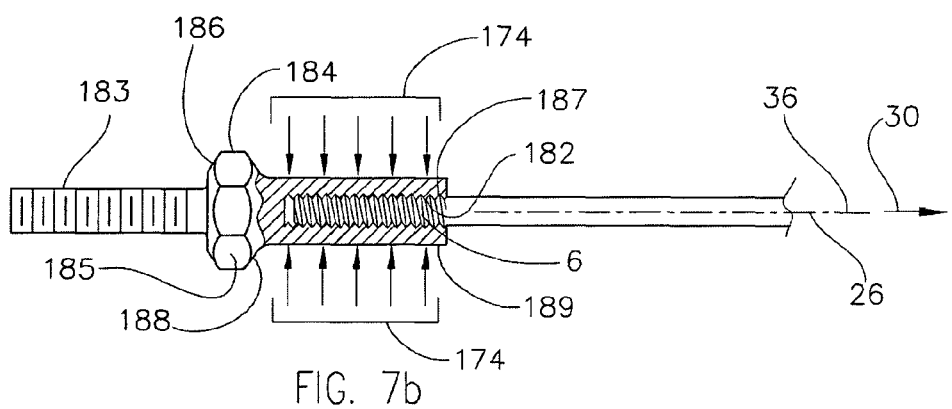

FIGS. 7a-b describe an embodiment similar to FIGS. 5a-e, however the fastener portion 183 is shown here to be integral with the connector 186. The term "integral" refers to the fastener portion 183 and connector 186 as combined as a single unit. As shown in FIG. 7a, connector 186 includes a configured surface consisting of a blind threaded hole 182 whose inside diameter is sized to provide a close clearance fit with the outside diameter of the second end 6 of spoke 2. Connector 186 includes an integral male-threaded fastener portion 183, an enlarged portion 184 with flats 185, a flared shoulder 188 and a shank 189.

The connector 186 is then swaged or crimped, as shown in FIG. 7b, where external crimping forces 174 are applied to press the outside of shank 189 in a direction perpendicular to the longitudinal axis 26. Swaging or crimping forces 174 serve to shrink the shank 189, thereby shrinking hole 182 into intimate contact with the second end 6 of the spoke 2 at engagement interface 187 in a manner previously described in FIGS. 5a-e and FIGS. 6a-b An effective connection between the connector 186 and the spoke 2 is thereby achieved. An intermediate connecting component, such as a spoke nipple (as described hereinabove), may be threaded onto the fastener portion 183 for connection to a bracing element such as the rim or hub flange (not shown). Alternatively, the fastener portion 183 may be directly threaded to engage the bracing element. Connector 186 may now serve as a connecting element to connect the spoke 2 to a bracing element. Wrench flats 185 formed into enlarged portion 184 allow the connector 186 to be rotatably manipulated about the longitudinal axis 26. Alternatively the flared shoulder 188 may be utilized to create an overlie engagement to engage the rim or hub flange in a manner similar to a spoke nipple.

Figure 7C:
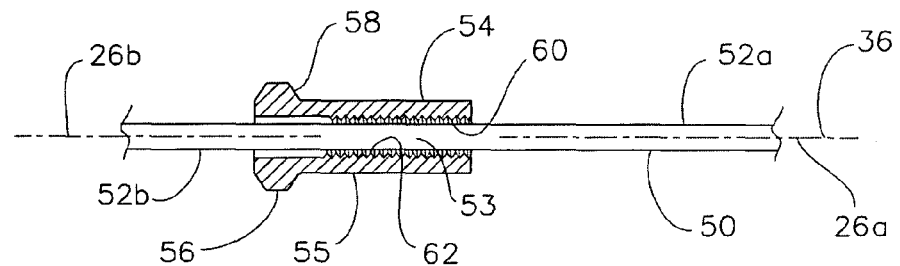
FIGS. 7c-d are partial cross-sectional views of an additional embodiment of the present invention, taken along the tensile axis, including a duplex spoke, and showing the sequence of operations involved in creating a crimped connection between the duplex spoke and the connector.
Figure 7D:
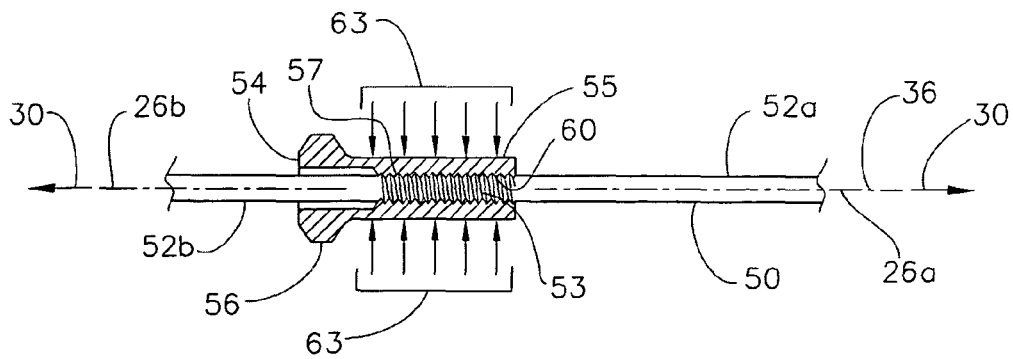

The embodiment of FIGS. 7c-d is similar to the embodiment of FIG. 6a-b, however, unlike the spoke 2, which may comprise only a single span, spoke 50 is shown to include two spans. As shown in the embodiment of FIGS. 7c-d, connector 54 includes a shank portion 55 and an enlarged head portion 56 with a transition surface 58 therebetween. Connector 54 also includes a through hole 60 with internal threads 62 comprising a configured surface. Spoke 50 is generally round in cross-section and is shown here to be a duplex spoke 50 to include a first span 52a and a second span 52b, with a common portion 53 therebetween. Each span 52a and 52b includes a corresponding longitudinal axis 26a and 26b respectively. As shown in FIG. 7c, the common portion 53 is first positioned within hole 60 such that the connector 54 overlaps the spoke 50 along the longitudinal axis 26a and 26b. The connector 54 is made of a harder material, such as aluminum and the spoke 50 is made of a softer material, such as fiber reinforced polymer.

Next, as shown in FIG. 7d, the connector 54 is crimped onto the common portion 53 of the spoke 50 with external crimp force 63 applied to the shank portion 55 of the connector 54 to cause this portion of the connector 54 to plastically deform and shrink inwardly. This deformation of the shank portion 55 causes the through hole 60 to shrink such that the harder internal threads 62 press and impinge the common portion 53 of the spoke 50 and the softer ductile common portion 53 is deformed to conform to the contour of internal threads 62. Thus, spoke 50 has an interlocking overlie engagement with the internal threads 62 and is also gripped by the connector 54 at engagement interface 57 to securely join and lock the connector 54 to the spoke 50 to resist spoke tension 30 loads. The connector 54 may then be connected to the hub (not shown) or may alternatively be connected to the rim 8 as described in FIGS. 3a-b. U.S. Pat. No. 7,192,097 discloses several representative arrangements where a duplex spoke as described in FIGS. 7c-d may be incorporated into a vehicle wheel. The connector 54 may alternatively employ a variety of functional geometries that may be designed to provide connection with the rim and/or hub.

FIGS. 8a-d describe a representative crimping method. This example shows how the connector 100 may be crimped by applying a crimping force perpendicular to the longitudinal axis of the spoke 2. As shown in FIG. 8a, connector 100 includes an outer surface 101 of height 116 and an internal hole or cavity 103. Spoke 2 is pre-assembled within cavity 103 with clearance 105 between the outside diameter of the spoke 2 and the diameter of the cavity 103. Connector 100 is shown to completely surround and enclose the cross-section of the spoke 2. As shown in FIG. 8b, punch 108 includes a punch face 110 and nest 112 includes a nest face 114. The pre-assembly is placed between a punch face 110 and nest face 114.

Next, as shown in FIG. 8c, punch 108 is pressed and driven in direction 106, which is perpendicular to the longitudinal axis, toward the nest 112 and against the connector 100 to sandwich and shrink the connector 100 into intimate contact with the spoke 2. As punch face 110 and nest face 114 are brought toward each other to press against the connector 100 from opposing directions, the connector 100 becomes crimped such that the height 116 of the connector 100 is reduced and shrunk and the cavity 103 contacts and impinges against the spoke 2. The connector 100 is made of ductile and malleable material such that it is plastically deformed (due to crimping force) to maintain this reduced height 116. The spoke is also preferably made of malleable and ductile material. Simultaneously, as the cavity 103 impinges against the spoke 2, the cross sectional shape of the spoke 2 may deform against the cavity 103, as shown in FIG. 8c, to create a matched surface interface between the spoke 2 and the cavity 103 at engagement interface 117. With the cavity 103 shrunk against the spoke 2, the spoke 2 becomes gripped and joined to the connector 100. It is also noted that connector 100 continuously surrounds the cross section of the spoke 2. The punch 108 and nest 112 are removed, as shown in FIG. 8d, and it may be seen that this new joinder between connector 100 and spoke 2 may now be used as a termination or a coupling to support spoke tension loads.

The crimping method of FIGS. 9a-c is very similar to that of FIGS. 8a-d, however this method includes pinching of the connector 120. As shown in FIG. 9a, connector 120 includes an outer surface 121 of height 136 and an internal hole or cavity 123. Spoke 2 is pre-assembled within cavity 123 with clearance 125 between the outside diameter of the spoke 2 and the diameter of the cavity 123. Punch 128 includes a punch face 130 and nest 132 includes a nest face 134. The pre-assembly is placed between a punch face 130 and nest face 134.

Next, as shown in FIG. 9b, punch 128 is pressed in direction 126 toward the nest 132 to sandwich and shrink the connector 120 into intimate contact with the spoke 2. As punch face 130 and nest face 134 are brought toward each other to press against the connector 120 from opposing directions (perpendicular to the longitudinal axis), the height 136 of the connector 120 is reduced and shrunk such that the cavity 123 contacts and impinges against the spoke 2. The connector 120 is made of ductile and malleable material such that it is plastically deformed to maintain its reduced height 136 and to create a matched surface interface between the spoke 2 and the cavity 123 at engagement interface 127. As shown in FIG. 9b, the connector 120 is also puckered slightly to create pinched folds 137a and 137b, which allow the connector 120 to collapse to a high degree to grip the spoke 2. It is noted that the spoke 2 still maintains a generally round cross section after crimping and its cross-section does not undergo such a dramatic deformation as previously described in FIGS. 8a-d. With the cavity 123 shrunk against the spoke 2, the spoke 2 becomes connected to the connector 120. The punch 128 and nest 132 are removed, as shown in FIG. 9c, and it may be seen that this new connection may now be used as a termination or a coupling to support spoke tension loads.

FIGS. 10a-c describe a representative crimping method similar to that of FIGS. 8a-d. This example shows how the connector 230 may be crimped by applying a force perpendicular to the longitudinal axis of the spoke 2. As shown in FIG. 10a, connector 230 includes an outer surface 231 and an internal hole or cavity 233. Spoke 2 is pre-assembled within cavity 233 with clearance 235 between the outside diameter of the spoke 2 and the diameter of the cavity 233. As shown in FIG. 10b, and in contrast to the semi-circular faces 110 and 114 of FIGS. 8b-c, punches 237a and 237b include faceted punch faces 238a and 238b respectively. The pre-assembly is placed between punch faces 238a and 238b. Punches 237a and 237b are then pressed toward each other in directions 239a and 239b to sandwich and shrink the connector 230 into intimate contact and impingement with the spoke 2 at engagement interface 236. As punch faces 238a and 238b are brought toward each other, the faceted punch faces 238a and 238b serve to press, forge and plastically deform the outer surface 231 into a non-circular hexagonal shape as shown in FIG. 10c. This hexagonally faceted deformation also provides a variable deformation around the cross sectional circumference of the connector 230 where the flats 240 correspond to a region of greater radial inward deformation and the peaks 242 correspond to a region of lesser radial inward deformation. This localized deformation may require lower crimping forces on the punches. Further, in comparison with the circular outer surface 141 of FIGS. 11a-c, the hexagonal shape of the outer surface 231 allows the connector to be easily manipulated or rotated with a tool such as a wrench (not shown). As also described in FIGS. 8a-d it may be seen that this crimped and deformed connection between the spoke 2 and the connector 230 may now be used as a termination or a coupling to support spoke tension loads.

The crimping method of FIGS. 11a-c is very similar to that of FIGS. 8a-d, however instead of crimping the connector 100 from two opposing directions, the connector 140 is pressed from six radially inwardly directions. As shown in FIG. 11a, connector 140 includes an outer surface 141 and an internal hole or cavity 143. Spoke 2 includes notch 144 in its cross-section and is pre-assembled within cavity 143 with clearance 145 between the outside diameter of the spoke 2 and the diameter of the cavity 143. A series of six punches 148, each include a punch face 150, are arranged in a radial configuration as shown. The pre-assembly is centrally placed within the series of punches 148.

Next, as shown in FIG. 11b, punches 148 are each pressed radially inwardly in respective radial directions 146 (perpendicular to the longitudinal axis) to sandwich and shrink the connector 140 into intimate contact with the spoke 2. As punch faces 150 are brought toward each other to radially press against the connector 140, the diameter 149 of the connector 140 is crimped and shrunk such that the cavity 143 contacts and impinges against the spoke 2. The connector 140 is made of ductile and malleable material such that it is thus plastically deformed to maintain its reduced diameter 149 and to create a matched surface interface between the spoke 2 and the cavity 143 at engagement interface 147. Material of the connector 140 is simultaneously pressed to conform to the notch 144 such that the engagement interface 147 is non-circular in cross-section and the connector 140 is rotationally keyed to the spoke 2 about the longitudinal axis. It is noted that the spoke 2 still maintains its original cross-section after crimping and does not undergo a shape deformation as previously described in FIGS. 8a-d. With the cavity 143 shrunk against the spoke 2, the spoke 2 becomes joined to the connector 140. The punches 148 are removed and it may be seen that this new connection can be used as a termination or a coupling to support spoke tension loads, as shown in FIG. 11c.

Figure 12A:
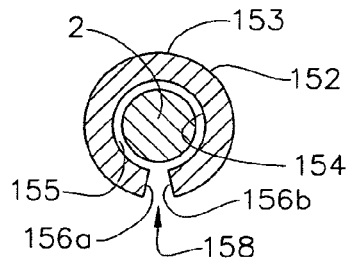
FIGS. 12a-c are cross-sectional views of an additional embodiment of the present invention, taken perpendicular to the tensile axis, and showing the progressive sequence of operations involved in creating a crimped connection between the spoke and the connector, including a connector with longitudinal split.
Figure 12B:
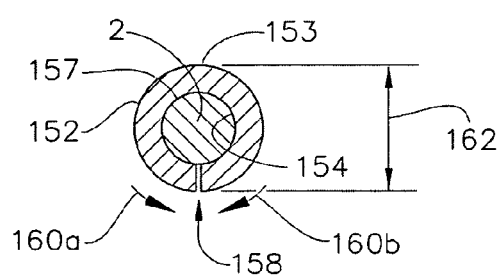

The circumferential crimping method of FIGS. 12a-b is similar to that of FIGS. 9a-c, however instead of the connector 120 being radially squeezed from two opposing directions to sandwich the spoke 2, the connector 152 is wrapped to circumferentially constrict around the cross section of the spoke 2. As shown in FIG. 12a, connector 152 includes an outer surface 153 and an internal hole or cavity 154 and a longitudinal split or gap 158 with corresponding edges 156a and 156b. Thus, in contrast to several other embodiments herein, such as FIGS. 8a-d, connector 120 does not continuously surround the cross section of the spoke 2. Spoke 2 is pre-assembled within cavity 154 with clearance 155 between the outside diameter of the spoke 2 and the diameter of the cavity 154. Crimping dies are not shown, but may be of any configuration known in industry.

Next, as shown in FIG. 12b, a crimping or swaging method serves to circumferentially deform the connector 152 in directions 160a and 160b, thus serving to shrink and reduce the diameter 162 of the outer surface 153 and to constrict the cavity 154 into intimate contact and impingement with the spoke 2 at engagement interface 157. It may be seen that the gap 158 is now reduced in response to the circumferential constriction of the connector 152. The connector 152 is made of ductile and malleable material such that it is thus plastically deformed to maintain its reduced diameter 162 and to create a matched surface interface between the spoke 2 and the cavity 154. The width of gap 158 is also reduced and edges 156a and 156b are brought toward each other. With the cavity 154 shrunk against the spoke 2, the spoke 2 becomes connected to the connector 152. It may be seen that this new connection can be used as a termination or a coupling to support spoke tension loads. It should be noted that, while all of the previous embodiments utilize a connector that continuously surrounds the cross section of the spoke, the embodiment of FIGS. 12a-b shows an example where the connector 152 discontinuously surrounds the cross section of the spoke 2.

Figure 12C:
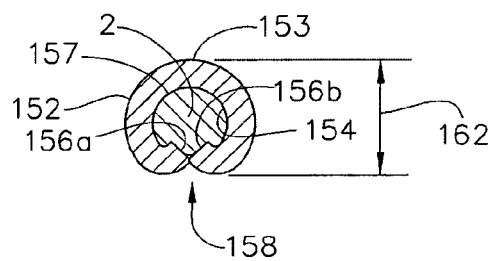

FIG. 12c describes an alternate crimping engagement similar to that described in FIG. 12b. In addition to the circumferential crimping described in FIG. 12b, this crimping method further serves to disrupt edges 156a and 156b inwardly as shown to impinge against the spoke 2. Such a crimping method is known in industry. Further, the edges 156a and 156b may be serrated such that when they impinge against the spoke 2 as shown, the outer surface of the spoke will deform to conform to the points of the serrations, thus creating an overlie engagement at the engagement interface to lock the connector 152 to the spoke 2 to support spoke tension forces.

In the previously described embodiments of the present invention, the spoke 2 is assembled to the connector in a generally longitudinal direction. This is because, in the non-deformed state, the connector encloses the cross-section of the spoke. In contrast, the crimping method of FIGS. 13a-b shows how the spoke 254 may be assembled to the connector 246 in a direction 258 that is generally perpendicular to the longitudinal axis 26 of the spoke 254.

Figures 13A, 13B:
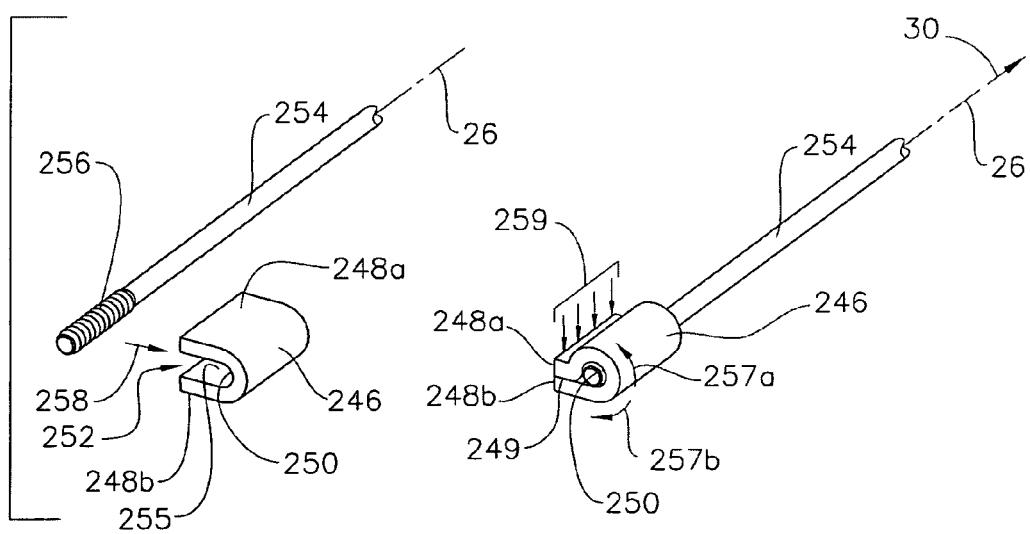
FIGS. 13a-b are partial perspective views of an additional embodiment of the present invention, showing the progressive sequence of operations involved in creating a crimped connection between the spoke and the connector, including a connector with longitudinal sidewall opening.

As shown in FIG. 13a, connector 246 has is a generally U-shaped element with a longitudinal opening 252, a base portion 250 and two tab portions 248a and 248b. Spoke 254 includes a configured portion 256, where the configured portion 256 may constitute a knurled surface, a threaded surface, a ribbed surface (as shown), or any other type of surface with variable geometry. The spoke 254 is first pre-assembled to the connector 246 in direction 258 and through the opening 252 such that the configured portion 256 is nested against the base 250.

Next, as shown in FIG. 13b, connector 246 is pressed and crimped with external crimp force 259 applied to tab portion 248a as shown. It may be seen that the opening 252 is then closed and tab portion 248a is now circumferentially wrapped in directions 257a and 257b around the cross section of the spoke 254. The interior surfaces 255 of the base 250 and tabs 248a and 248b are now constricted to circumferentially press around the configured surface 256 in a manner similar to that described in FIGS. 12a-b. Tab portions 248a and 248b are pressed together to meet at pinched seam 249, which may be considered as a longitudinal split. The connector 246 is made of ductile and malleable material such that it is plastically deformed in response to crimp force 259 to maintain this closed configuration.

In this embodiment, the connector 246 is made of a softer material, such as aluminum and the spoke 254 is made of a harder material, such as steel. During the crimped deformation, softer ductile interior surfaces 255 of the connector 246 are pressed and impinged against the harder configured portion 256 of the spoke 254 such that the interior surface 255 is deformed to conform to the contour of the configured surface 256 in a manner similar to that described in FIGS. 6c-d. There is now a matched surface interface and a corresponding overlie engagement between the configured surface 256 and the interior surface 255 of the connector 246. Thus the spoke 254 is securely joined to the connector 246 to resist spoke tension 30 loads.

Figure 14A:
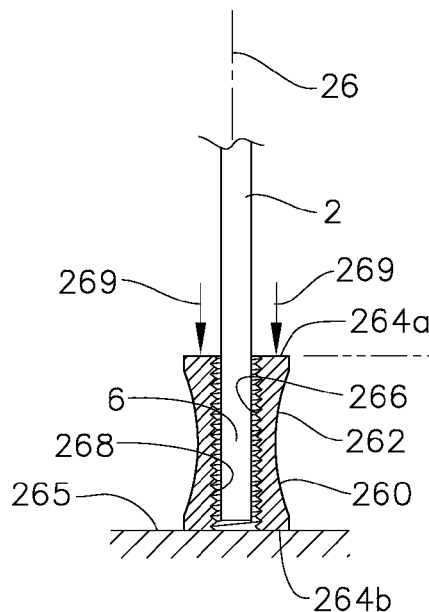
FIGS. 14a-b are partial cross-sectional views of an additional embodiment of the present invention, taken parallel to the tensile axis, showing the progressive sequence of operations involved in creating a crimped connection between the spoke and the connector, including crimping force applied parallel to the longitudinal axis and resultant gripping force acting perpendicular to the longitudinal axis.
Figure 14B:
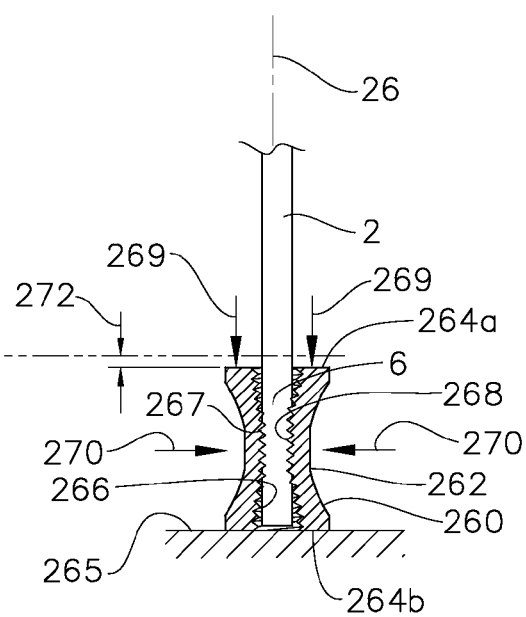

Most of the previous embodiments show the connector as being plastically deformed by an applied force that acts in a direction generally perpendicular to the longitudinal axis 26 of the spoke. In contrast, the embodiments of FIGS. 14a-b and FIGS. 15a-b describe embodiments where the connector is plastically deformed by an applied force that acts in a direction generally parallel to the longitudinal axis 26. As shown in FIG. 14a, connector 260 includes a necked region 262, end faces 264a and 264b, and a through hole 266 with internal threads 268. Second end 6 of spoke 2 is inserted in hole 266 as shown and end face 264b is temporarily braced against anvil 265. Connector 260 is of harder material than the spoke 2.

Next, crimping force 269 is applied against end face 264a. This causes the connector 260 to plastically deform such that end face 264a is displaced by distance 272. This causes necked region 262 to be displaced inwardly in direction 270 to reduce the size of hole 266. Internal threads 268 are correspondingly displaced inwardly such that internal threads 268 impinge on second end 6 as shown. It may be seen that the necked region 262 provides geometry to facilitate a gripping force that acts in a direction that is perpendicular to the crimping direction 270. Thus, internal threads 268 may be considered as a configured internal surface that impinges against the spoke 2 such that the spoke 2 is deformed to engage the internal threads. The connector 260 is made of ductile and malleable material such that it is plastically deformed to maintain an impinged engagement with a matched surface interface between the spoke 2 and the internal threads 268. With the internal threads 268 shrunk against the second end 6, the spoke 2 becomes connected to the connector 260 at engagement interface 267. It may be seen that this new connection can be used as a termination or a coupling to support spoke tension loads.

Figure 15A:
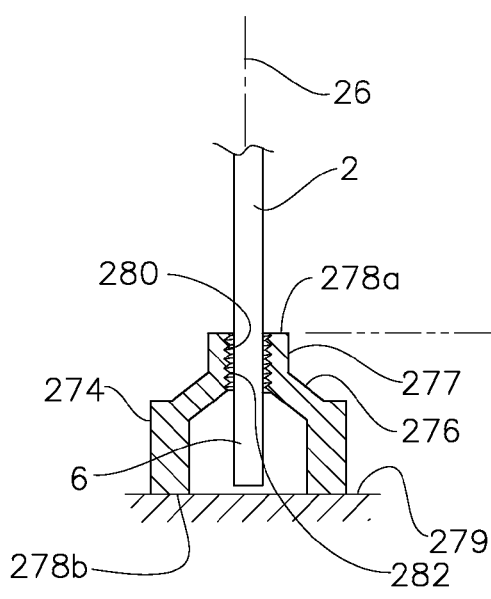
FIGS. 15a-b are partial cross-sectional views of an additional embodiment of the present invention, taken parallel to the tensile axis, showing the progressive sequence of operations involved in creating a crimped connection between the spoke and the connector, including crimping force applied parallel to the longitudinal axis and resultant gripping force acting perpendicular to the longitudinal axis.
Figure 15B:
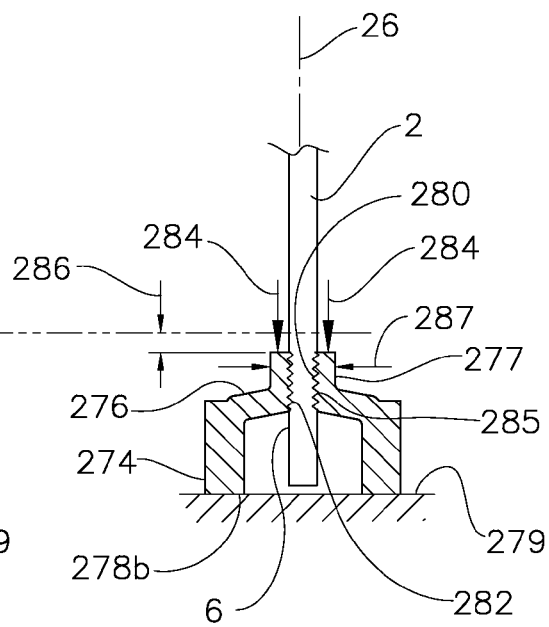

As shown in FIGS. 15a-b, connector 274 includes a conical flange 276, a collar 277, end faces 278a and 278b, and a through hole 280 with internal threads 282. Second end 6 of spoke 2 is inserted in hole 280 as shown and end face 278b is temporarily braced against anvil 279. Connector 274 is of harder material than the spoke 2. Next, crimping force 284 is applied against end face 278a. This causes the connector 274 to plastically deform such that end face 278a is displaced by distance 286, which causes conical flange 276 to toggle and flatten such that collar 277 is, in turn, displaced inwardly in direction 287 as shown in FIG. 15b. It may be seen that the conical flange 276 provides geometry to facilitate a gripping force on the spoke that acts in a direction 287 that is perpendicular to the crimping direction 284. As collar 277 is displaced in direction 287, hole 280 and internal threads 282 are also displaced inwardly such that internal threads 282 impinge on second end 6 as shown. Thus, internal threads 282 may be considered as a configured internal surface that impinges against the spoke 2 such that the spoke 2 is deformed to engage the internal threads 282. The connector 274 is made of ductile and malleable material such that it is plastically deformed in response to force 284 to maintain its impinged engagement with a matched surface interface between the spoke 2 and the internal threads 282. With the internal threads 282 shrunk against the second end 6, the spoke 2 becomes connected to the connector 274 at engagement interface 285. It may be seen that this new connection can be used as a termination or a coupling to support spoke tension loads.

Figure 16A:
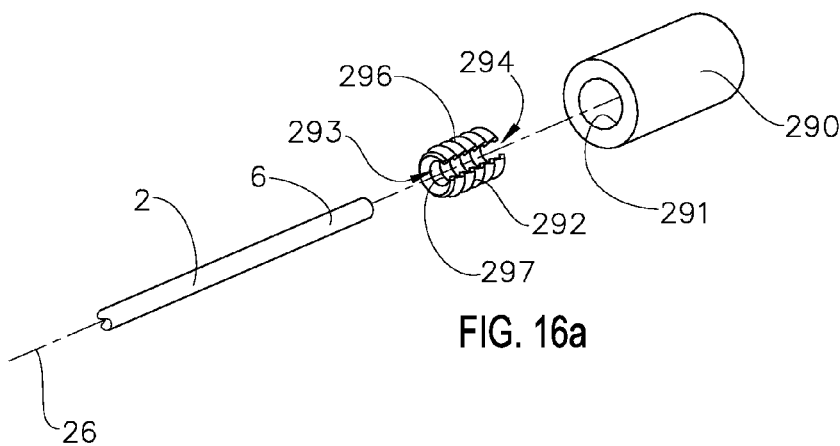
FIG. 16a is a partial perspective view of an additional embodiment of the present invention, in exploded assembly, including an intermediate joining element located between the spoke and the connector.
Figures 16B, 16C:
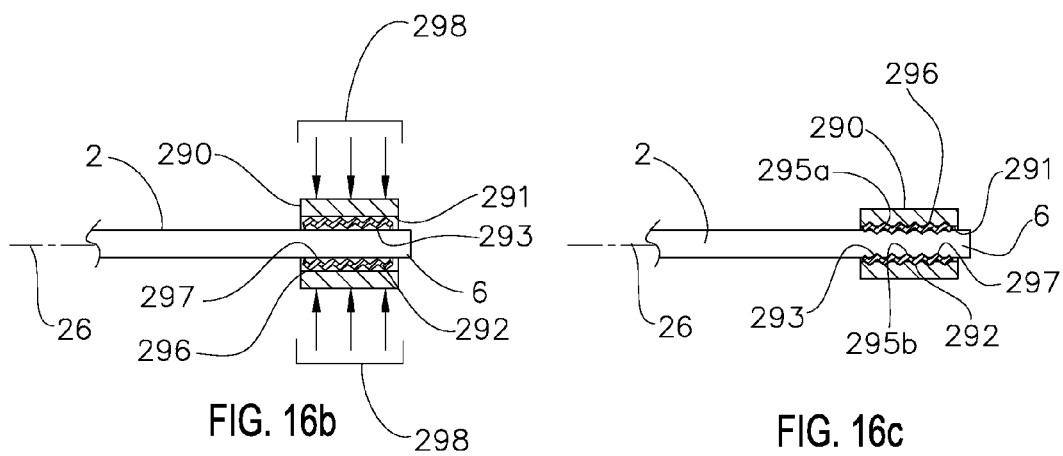
FIGS. 16b-c are partial cross-sectional views of the embodiment of FIG. 16, taken parallel to the tensile axis, showing the progressive sequence of operations involved in creating a crimped connection between the spoke and the connector, including the intermediate joining element therebetween.

The embodiment of FIGS. 16a-c includes elements of the embodiments of FIGS. 6c-d and FIGS. 12a-b. As shown in FIG. 16a, connector 290 is made of malleable and ductile material and includes longitudinal through hole 291. Collar 292 includes longitudinal split 294 and external ribs 296 and a longitudinal through hole 293 with internal ribs 297. External ribs 296 and internal ribs 297 may both be considered as configured surfaces. The material of the collar 292 is harder than both the material of the connector 290 and the material of the second end 6 of the spoke 2. For example, the connector 290 may be comprised of malleable aluminum and the collar 292 may be hard steel and the spoke 2 may be fiber reinforced polymer.

As shown in FIG. 16b, the collar 292 is first pre-assembled to overlap both the spoke 2 and the connector 290 along the longitudinal axis 26. The connector 290 is then swaged or crimped with external crimping forces 298 applied to the outside of the connector 290. Crimping forces 298, due to the crimping or swaging processes, serve to plastically deform and shrink the connector 290, thereby shrinking hole 291 into intimate contact and impingement with the collar 292, which in turn is shrunk (by circumferentially collapsing the split 294) such that hole 293 is shrunk and brought into intimate contact and impingement with the second end 6 of the spoke 2. Thus, as seen in FIG. 16c, external ribs 296 are embossed and embedded within the hole 291 of the connector 290 at engagement interface 295a such that the connector 290 and the collar 292 are engaged and locked together. Simultaneously, internal ribs 297 emboss and embed into the external surface of the second end 6 of the spoke 2 at engagement interface 295b such that the collar 292 and spoke 2 are engaged and locked together. Connector 290 and spoke 2 are now joined together through collar 292. Generically, it may be viewed that collar 292 serves as an "intermediate joining element" where the connector 290 is deformed to join to the collar 292 and the collar 292 is also thereby deformed to join to the spoke 2, thus creating an effective deformed joinder between the connector 290 and the spoke 2. Connector 290 may now serve as a connecting element to connect the spoke 2 to a bracing element such as the rim or hub flange in a manner similar that previously described. It is noted that the geometry of the connector 290 and spoke are shown as generic cylindrical shapes for description purposes. Alternatively, a wide variety of geometries and arrangements may be incorporated into the design that may add to the functionality and/or aesthetics of the system. As a further alternative, it is also envisioned that the collar 292 may include geometry that is external to the connector 290 that may also be utilized to connect to a bracing element (not shown).

Figure 17:
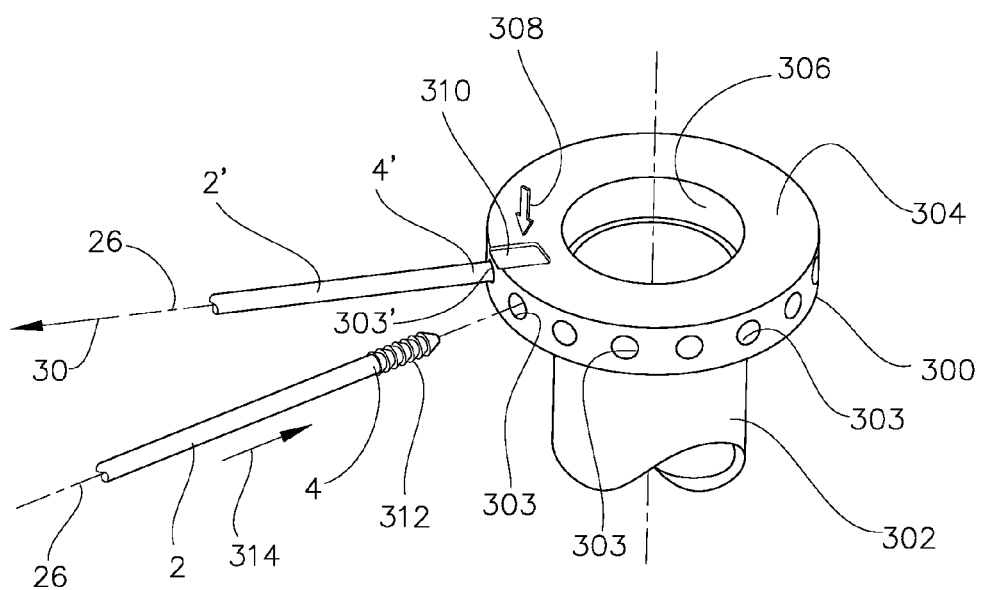
FIG. 17 is a partial perspective view of an additional embodiment of the present invention, in partially exploded assembly, including a multiplicity of spokes joined to a single connecting element via a crimped joinder and showing the connecting element as integral with the hub flange.

FIG. 17 describes an embodiment similar to several of those described previously, however this figure shows a multiplicity of spokes joined, by means of a crimped joinder, to a single connecting element (i.e. hub flange 300). This figure also shows the spokes as joined directly to a bracing element (i.e. hub flange 300). In other words, the hub flange 300 may be viewed as integral and unitary with a corresponding series of connecting elements. As shown, spokes 2 and 2' are identical to each other and include first ends 4 and 4' respectively, each with a series of external ribs 312 and 312' respectively, and longitudinal axis 26. Ribs 312 constitute a configured surface of variable surface and cross-section geometry. Hub shell 302 includes bearing bore 306 to accept a bearing and axle (both not shown) and an annular hub flange 300 with a flange face 304 and a series of radially extending blind holes 303 to accept the spokes 2. Holes 303 are initially sized to accept the ribs 312 and first end 4. Hub flange 300 is similar to hub flange 16 of FIG. 1 in its overall function as a bracing element to connect to the inboard end of the spokes. In this embodiment, it is preferred that first ends 4 and 4' are of harder material than the material surrounding holes 303 such that sidewalls of holes 303 may be embossed by first ends 4 and 4'.

Spoke 2 is shown prior to assembly with the hub flange 300, with the first end 4 aligned to be inserted into hole 303 in direction 314. Spoke 2' is shown as assembled and joined to the hub flange 300. First end 4' has first been inserted into hole 303'. Next, flange face 304 has been locally pressed with a punch (not shown) in direction 308 to create a plastically embossed indent 310 adjacent hole 303 as shown. As flange face 304 is pressed and indented, the hub flange 300 material is displaced and adjacent hole 303' is thereby plastically collapsed and shrunk against the ribs 312' and second end 4' of spoke 2'. Thus spoke 2' is gripped by the hole 303', with ribs 312' also embossing the sidewalls of hole 303' in a manner similar to that previously described herein, thereby creating a gripped and interlocking joinder between the hub flange 300 and the spoke 2' that is capable of supporting spoke tension 30. A full complement of spokes 2 are joined to their respective holes 303 by means of additional crimped indents in a similar manner as just described. This full complement of spokes may be crimped in place one at a time as shown or they may be simultaneously crimped, all at one time.

Figure 18A:
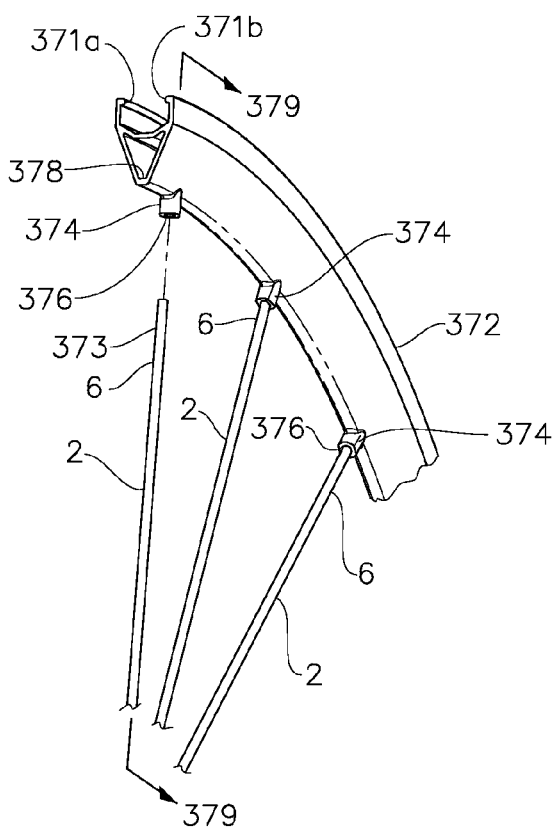
FIG. 18a is a partial perspective view of an additional embodiment of the present invention, in partially exploded assembly, including a multiplicity of spokes joined to a single connecting element via a crimped joinder and showing the connecting element as integral with the outer rim.
Figure 18B:
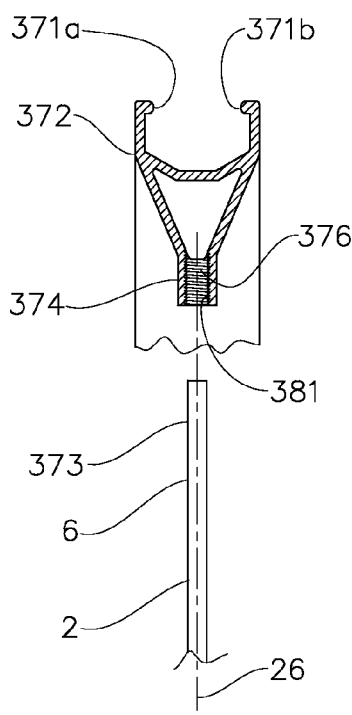
FIGS. 18b-d are partial cross-sectional views of the embodiment of FIG. 18a, as seen generally in the direction 379-379, showing the progressive sequence of operations involved in creating a crimped connection between the spoke and the outer rim.
Figure 18C:
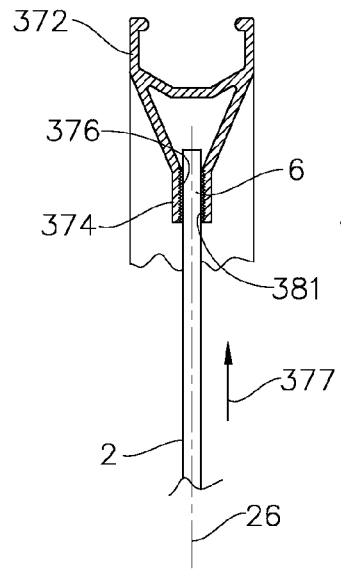

While FIG. 17 shows an example where the spoke(s) may be directly joined to the hub flange, it is also envisioned that the spokes may be joined at their second end to the outer rim in a similar manner. FIG. 18a-d describe an embodiment where the second end 6 of the spoke 2 is directly joined to the rim 372. Rim 372 includes radially outwardly facing flanges 371a and 371b to accept a conventional tire (not shown) and a spoke bed 378 wall, to which the spokes 2 are joined. Spoke bed 378 includes a series of unitary and integral collars 374 extending radially inwardly therefrom, each with a hole 376 therethrough that extends in a generally radial direction. FIG. 18a shows a portion of the outer rim 372 hoop, with some of the spokes 2 fixed to the rim 372 and with one of the spokes 2 ready to be assembled to the rim. Rim 372 is constructed of harder material, such as aluminum, in comparison with the spokes 2, which may be constructed of a comparatively softer material such as fiber-reinforced polymer. As may be seen in FIG. 18b, which shows a spoke 2 prior to assembly with the rim 372, the outer surface 373 of spoke 2 is sized to fit within the hole 376 that extends through the spoke bed 378. Hole 376 includes a configured surface such as internal threads 381 along its interior sidewall. The second end 6 of the spoke 2 is then inserted and pre-assembled into hole 376 in the direction 377 as shown in FIG. 18c.

Figure 18D:
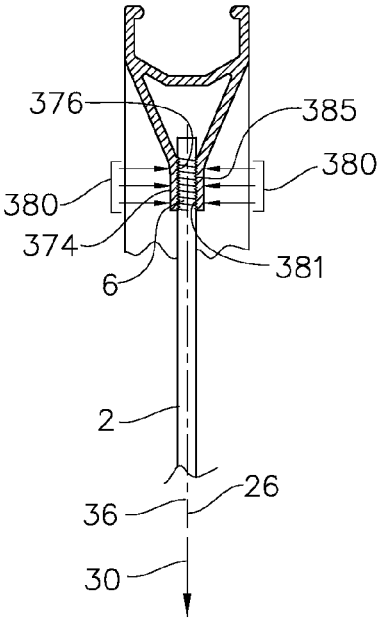

With spoke 2 in place, crimping force 380 is applied to the collar 374 as shown in FIG. 18d such that collar 374 is crimped and plastically deformed to collapse and shrink against the second end 6 of spoke 2. Simultaneously internal threads 381 serve to emboss and deform the outer surface 373 of the second end 6 in a manner similar to that previously described herein. Thus, a gripped and interlocking longitudinal joinder is created at an engagement interface 385 between the rim 372 and the spoke 2 that is capable of supporting spoke tension 30 along the tensile axis 36. A full complement of spokes 2 may be joined to their respective holes 376 in a similar manner as just described.

Figure 19A:
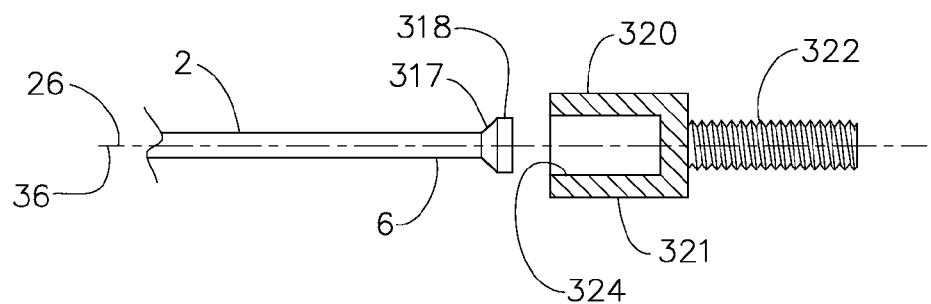
FIG. 19a is a partial cross-sectional view of an additional embodiment of the present invention, taken parallel to the tensile axis, in partially exploded assembly, including a spoke with an enlarged head.
Figure 19B:
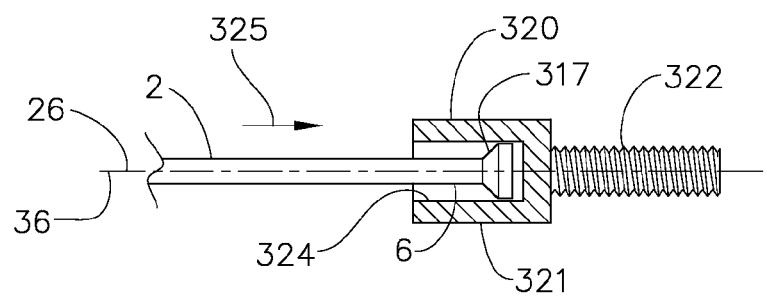
FIGS. 19b-c are partial cross-sectional views of the embodiment of FIG. 19a, taken parallel to the tensile axis, showing the progressive sequence of operations involved in creating a crimped connection between the spoke and the connector, where the connector serves to retain the spoke without necessarily gripping or impinging upon it.
Figure 19C:
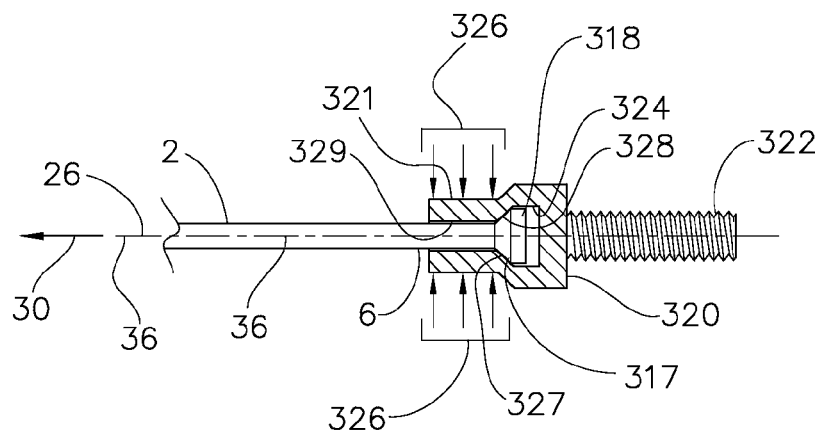

While the previous embodiments have focused on a crimped connection to press and grip the surface of the spoke, the embodiment of FIGS. 19a-c shows how the connector 320 may be crimped to merely retain the spoke 2 without necessarily gripping and/or impinging upon it. As shown in FIG. 19a, spoke 2 includes a longitudinal axis 26 and an enlarged head 318 portion and conical transition surface 317 formed into its second end 6. Connector 320 includes an external surface 321 and a longitudinal blind hole 324 sized to accept the enlarged head 318 and an integral threaded fastener 322 for subsequent connection with a bracing element (not shown). As shown in FIG. 19b, the spoke 2 is pre-assembled to the connector 320, with enlarged head 318 inserted in hole 324 in direction 325. Next, as shown in FIG. 19c, crimp force 326 is applied to the external surface 321 such that a portion of collar 320 is crimped and plastically deformed to collapse and shrink the hole 324 inwardly toward the second end 6 of spoke 2. Hole 324 now includes a reduced region 329 with a transition surface 328 extending outwardly to the original non-deformed hole 324 portion as shown. The reduced region 329 is now smaller than the enlarged head 318 and the enlarged head 318 is thus captured by the reduced region 329. As such, the transition surface 328 is now overlying and bearing against the conical transition surface 317, thus creating a locking and retained joinder between the connector 320 and the spoke 2 at engagement interface 327. With the connector 320 connected to a bracing element, this joinder is capable of supporting spoke tension 30 along the tensile axis 36.

Figure 20A:
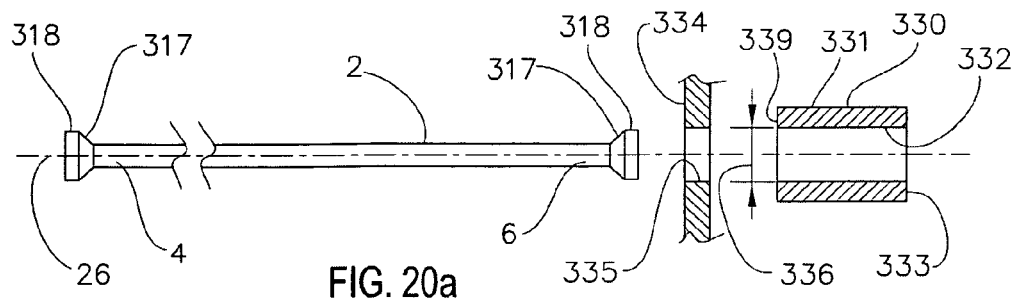
FIG. 20a is a partial cross-sectional view of an additional embodiment of the present invention, taken parallel to the tensile axis, in partially exploded assembly, including a spoke with an enlarged head.
Figure 20B:
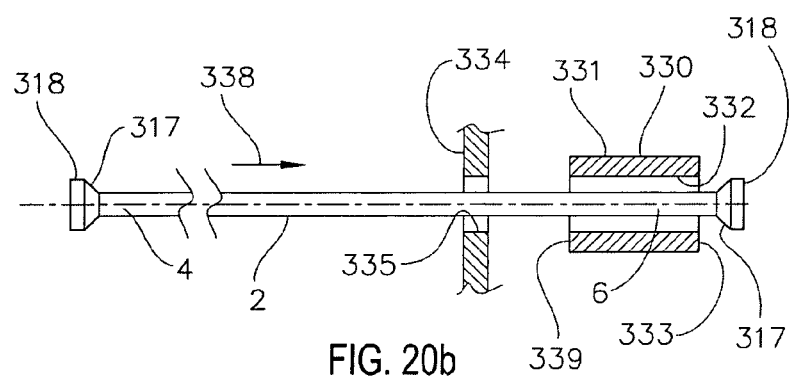
FIGS. 20b-d are partial cross-sectional views of the embodiment of FIG. 20a, taken parallel to the tensile axis, showing the progressive sequence of operations involved in creating a crimped connection between the spoke and the connector, where the spoke has an overlie connection with an end face of the connector.
Figure 20C:
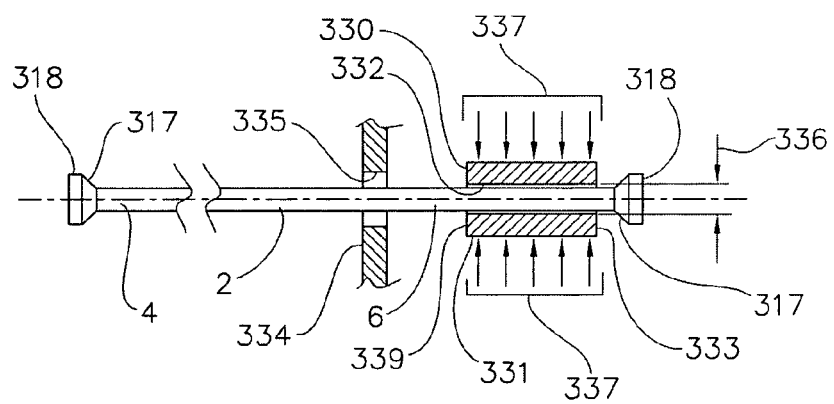
Figure 20D:
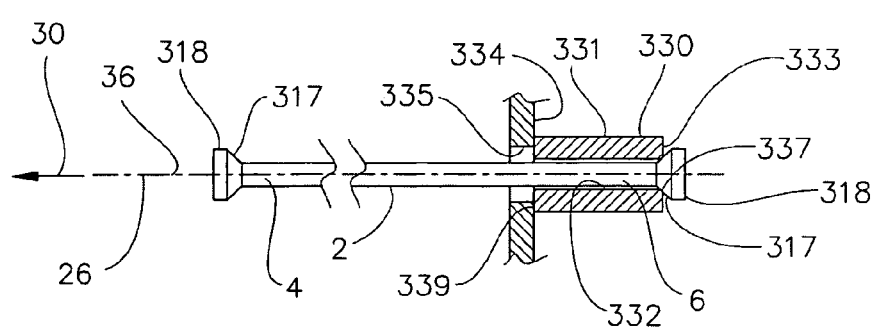

FIGS. 20a-d describe an embodiment similar to that of FIGS. 19a-c, however FIGS. 20a-d show the spoke as extending through the connector 330. As shown in FIG. 20a, spoke 2 includes a longitudinal axis 26 with an enlarged head 318 portion and conical transition surface 317 formed into both its first end 4 and second end 6. Bracing element 334 is schematically shown and includes opening 335 therethrough. Connector 330 includes an external surface 331, end face 333, engagement surface 339 and a longitudinal through hole 332 sized to accept the enlarged head 318. Both opening 335 and hole 332 are sized to permit the enlarged head 318 to pass through. As shown in FIG. 20b, the spoke 2 is pre-assembled to the connector 330, with enlarged head 318 inserted through opening 335 and through hole 332 in direction 338 such that transition surface 317 is outboard and beyond the end face 333. Next, as shown in FIG. 20c, crimp force 337 is applied perpendicular to the external surface 331 such that connector 330 is crimped and plastically deformed to collapse and shrink the hole 332 inwardly such that diameter 336 is reduced. Now the hole 332 is smaller in diameter than the enlarged head 318 while the outer surface 331 of the connector 330 is still larger than the opening 335. Finally, as shown in FIG. 20d, spoke tension 30 is applied to the spoke 2, which draws the transition surface 317 against the end face 333 and in turn draws the engagement surface 339 against the bracing element 334. Thus it may be seen that spoke 2 is now engaged to the bracing element and terminated by means of two overlying engaged connections: a first engagement created between the spoke 2 and the connector 330 at engagement interface 337 and a second engagement between the connector 330 and bracing element 334. The crimped joinder is now capable of supporting spoke tension 30 along the tensile axis 36.

Figure 21A:
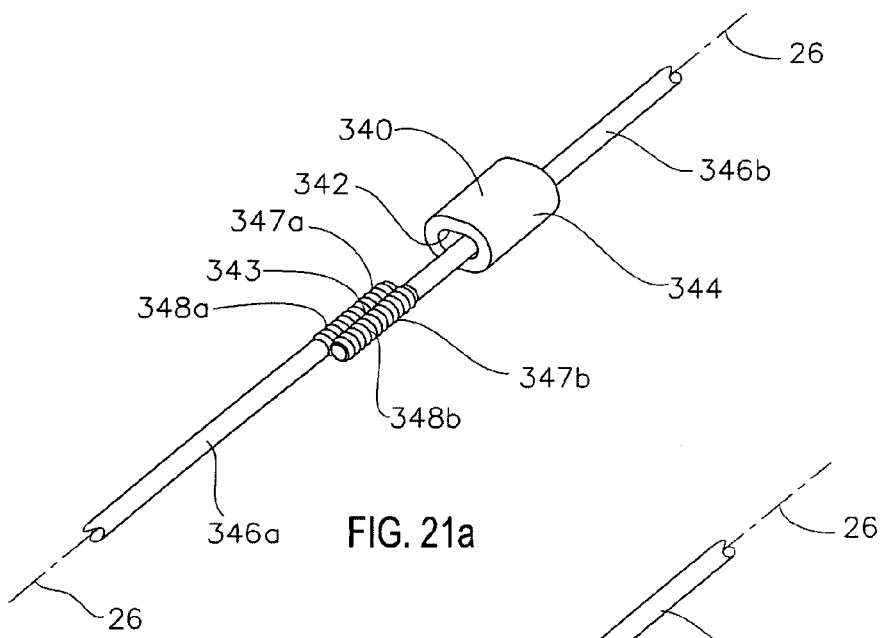
FIGS. 21a-c are partial perspective views of an additional embodiment of the present invention, showing the progressive sequence of operations involved in creating a crimped connection between a spoke and a connector, in a coupling arrangement where two spokes are interlocked and engaged to each other within the connector.
Figure 21B:
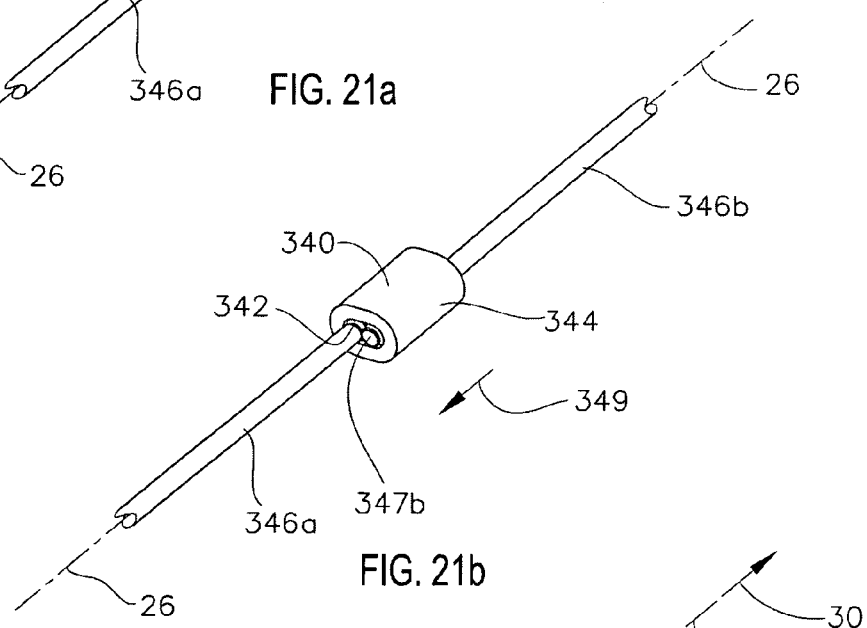
Figure 21C:
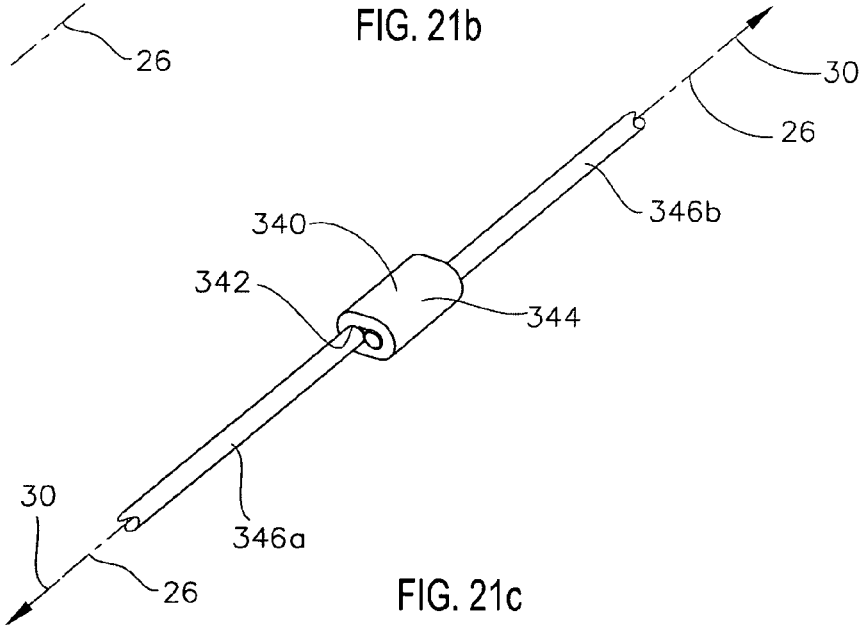

FIGS. 21a-c describe an embodiment similar to the embodiment of FIGS. 6c-d, however this arrangement shows the connector as providing a coupling function between two spokes, where the spokes are also engaged to each other. Spokes 346a and 346b are of harder material, such as stainless steel, and each include a longitudinal axis 26 and end portions 347a and 347b with ribs 348a and 348b respectively. Connector 340 is of softer material, such as aluminum, and includes outer surface 344 and internal cavity or hole 342 that extends through the connector along the longitudinal axis 26. As shown in FIG. 21a, end portions 347a and 347b are overlapped along the longitudinal axis such that ribs 348a of spoke 346a are interlocked and engaged with ribs 348b of spoke 346b at engagement interface 343. Connector 340 is retracted and spaced away from end portions 347a and 347b. Next, as shown in FIG. 21b, the connector 340 is slid in direction 349 to cover and surround end portions 347a and 347b and associated ribs 348a and 348b. Finally, as shown in FIG. 21c, the collar 340 is plastically crimped and reduced as previously described herein. The hole 342 is similarly shrunk inwardly such that ribs 348a and 348b are pressed together and retained in place. Simultaneously, the harder ribs 348a and 348b press and impinge the generally smooth walls of the hole 342 such that the softer ductile hole 342 is deformed to conform to the contour of ribs 348a and 348b. Thus, connector 340 has a gripped and overlying engagement with the ribs 348a and 348b and serves to connect spokes 346a and 346b. Additionally, spokes 346a and 346b are directly connected to each other via interlocking ribs 348a and 348b. This connection between spokes 346a and 346b can now support spoke tension 30 forces.

Figure 22A:
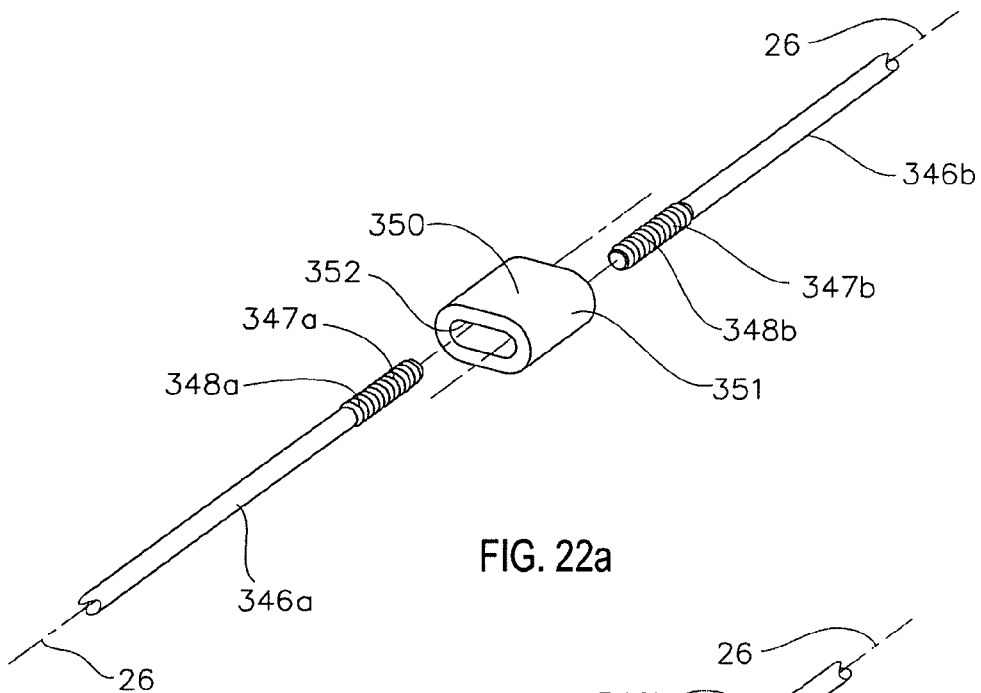
FIGS. 22a-c are partial perspective views of an additional embodiment of the present invention, showing the progressive sequence of operations involved in creating a crimped connection between a spoke and a connector, in a coupling arrangement where two spokes are separately engaged to a single common connector.
Figure 22B:
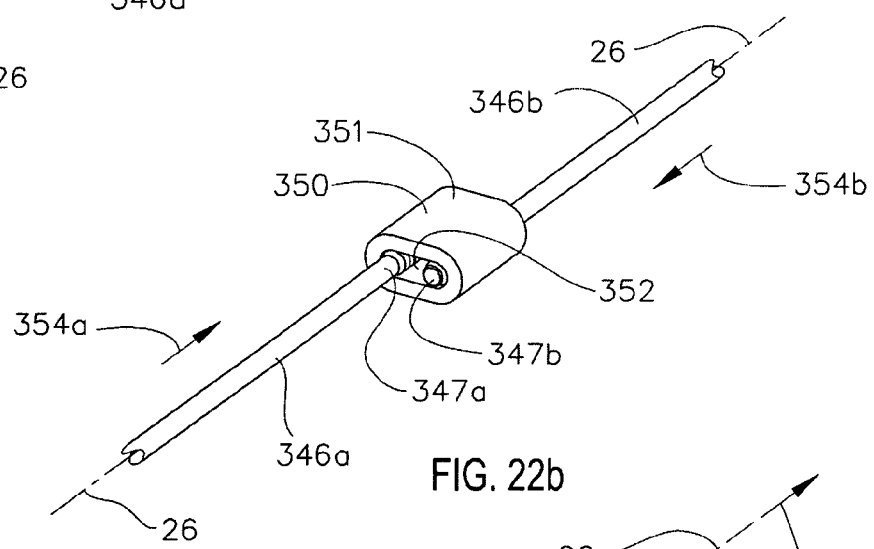
Figure 22C:
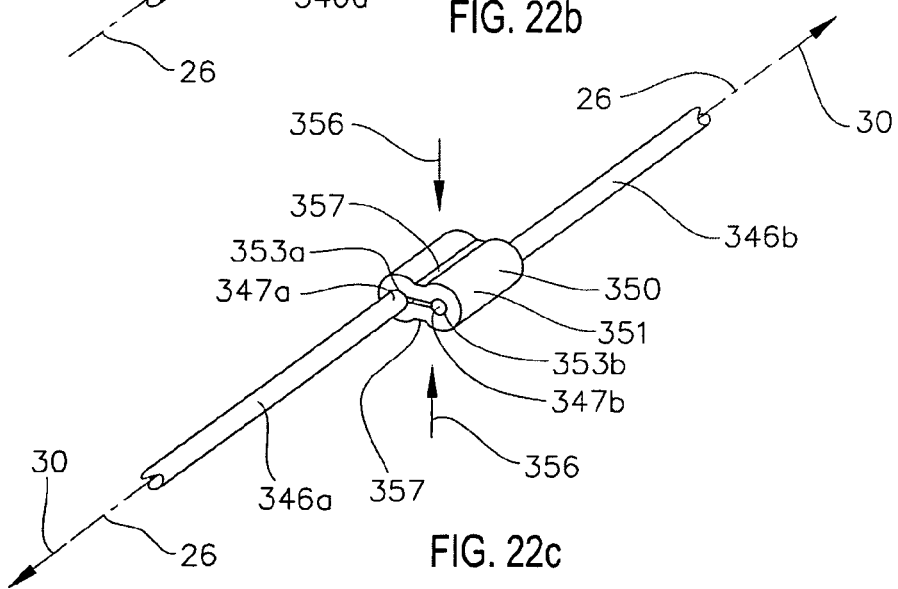

FIGS. 22a-c describe a coupling embodiment similar to the embodiment of FIGS. 21a-c, with the connector 350 providing a coupling function between two spokes 346a and 346b, however the spokes 346a and 346b are not directly engaged to each other. Spokes 346a and 346b each include longitudinal axis 26 and end portions 347a and 347b with ribs 348a and 348b respectively. Connector 350 is of softer material, such as aluminum, and includes outer surface 351 and internal cavity or hole 352 that extends through the connector along the longitudinal axis 26. As shown in FIG. 22a, end portions 347a and 347b are aligned to be inserted into the connector 350. Next, as shown in FIG. 22b, the spokes 346a and 346b are inserted in respective directions 354a and 354b into hole 352 such that connector 350 covers and surrounds end portions 347a and 347b and associated ribs 348a and 348b. Finally, as shown in FIG. 22c, the collar 350 is plastically crimped in direction 356 and reduced as previously described herein, including associated indents 357. The hole 352 is similarly shrunk inwardly to conform to end portions 347a and 347b such that the harder ribs 348a and 348b press and impinge the generally smooth walls of the softer ductile hole 352, which is deformed to conform to the contour of ribs 348a and 348b. Thus, connector 350 has a gripped and overlying engagement with the ribs 348a and 348b at engagement interfaces 353a and 353b respectively and serves to connect spokes 346a and 346b to each other. This connection between spokes 346a and 346b can now support spoke tension 30 forces.

Figure 23A:
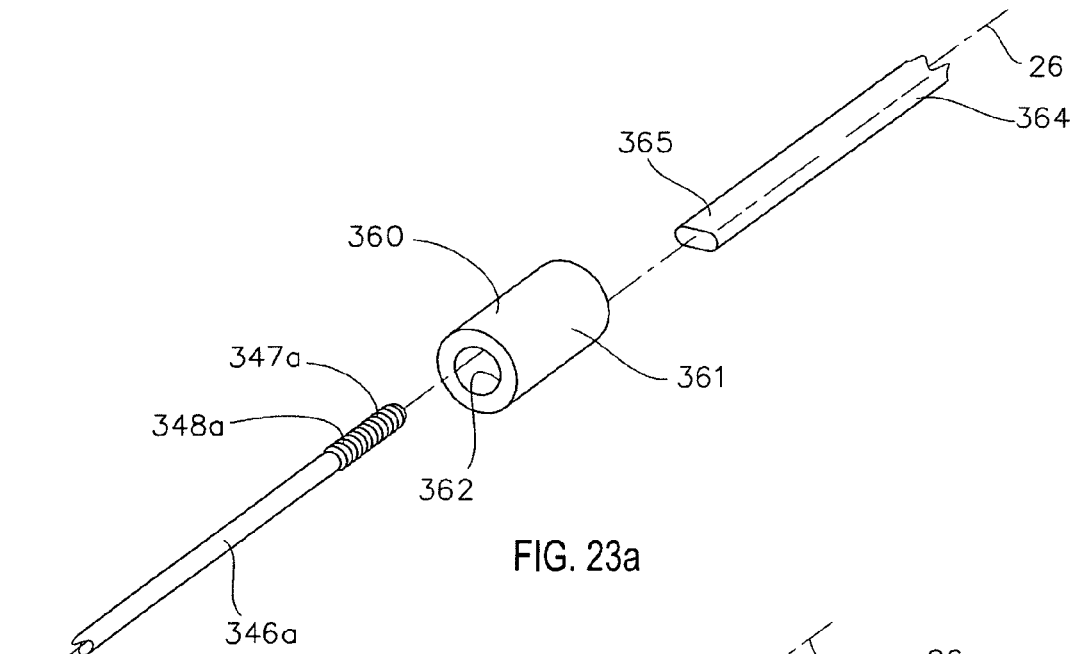
FIGS. 23a-c are partial perspective views of an additional embodiment of the present invention, showing the progressive sequence of operations involved in creating a crimped connection between a spoke and a connector, in a coupling arrangement where two spokes are deformably joined to each other.
Figure 23B:
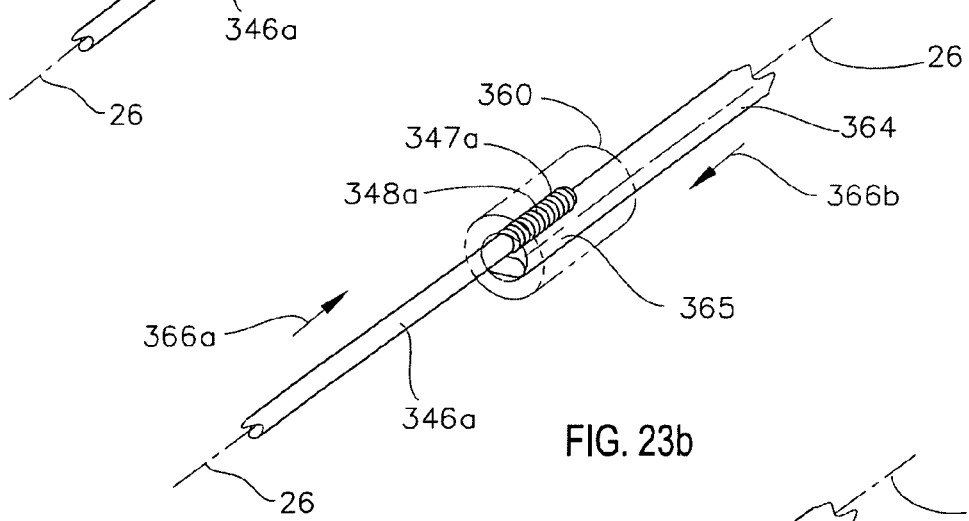
Figure 23C:
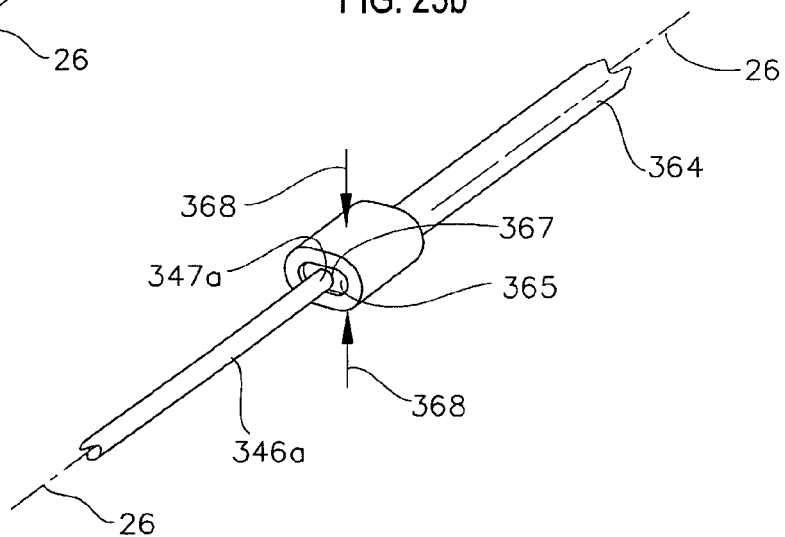

FIGS. 23a-c describe an embodiment similar to the embodiment of FIGS. 21a-c, with the connector 360 providing a coupling function between two spokes 346a and 364, where these spokes are also directly engaged to each other. Spoke 346a is of harder material, such as stainless steel, and includes end portion 347a with ribs 348a. Spoke 364 has a flattened cross section and is of softer material, such as fiber-reinforced polymer, and includes end portion 365. Connector 360 is of an intermediate hardness material, such as aluminum, and includes outer surface 361 and internal hole 362 that extends through the connector along the longitudinal axis 26. As shown in FIG. 23a, end portions 347a and 365 are aligned to be inserted into the connector 360. Next, as shown in FIG. 23b, the spokes 346a and 364 are inserted in respective directions 366a and 366b into hole 362 such that connector 360 (shown in phantom for clarity) covers and surrounds end portions 347a and 365. End portions 347a and 365 are overlapped along the longitudinal axis 26. Finally, as shown in FIG. 23c, the connector 360 is plastically crimped in direction 368 and reduced as previously described herein. The hole 362 is similarly shrunk inwardly such that ribs 348a are pressed and embedded into softer end portion 365 in direction 368 and end portion 365 is deformed to conform to the contour of ribs 348a at connecting interface 367. Thus, ribs 348a have an interlocking engagement with end portion 365 for a direct connection therebetween. The deformed connector 360 serves to maintain this interlocked engagement and press ribs 348a and end portion 365 into intimate engagement. This connection between spokes 346a and 364 can now support spoke tension 30 forces.

Figure 24A:
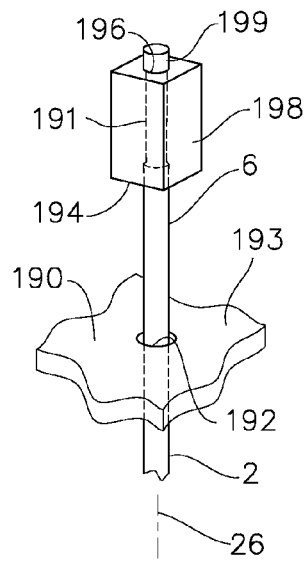
FIG. 24a is partial perspective view of an additional embodiment of the present invention, in partially exploded assembly, including a bracing element.
Figure 24B:
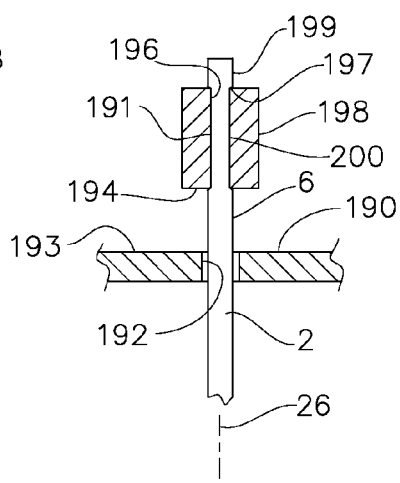
FIG. 24b is a partial cross-sectional view of the embodiment of FIG. 24a, taken parallel to the tensile axis, in partially exploded assembly, illustrating the connector in frictionally gripped engagement with the spoke.
Figure 24C:
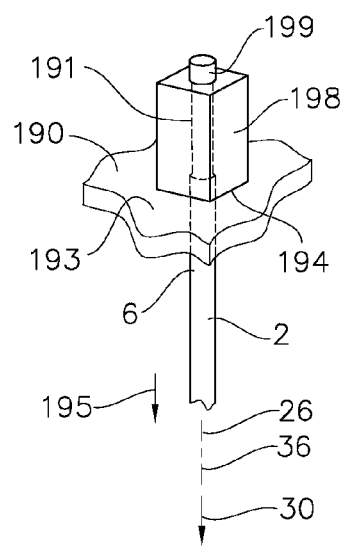
FIG. 24c is partial perspective view of the embodiment of FIG. 24a, showing an overlie engagement between the connector and bracing element.

FIGS. 24a-c describe one illustrative example of how a spoke, including a crimped connector, may be anchored against a bracing element. Spoke 2 is joined to connector 198 via a crimped joiner as described variously herein. As shown in FIG. 24a, the connector 198 includes cavity or hole 196 extending therethrough and downward facing bearing surface 194 for engagement with the bracing element 190. It may be viewed that connector 198 serves as an enlarged portion of the spoke 2 and that bearing surface 194 serves as an engagement or transition surface. The second end 6 of the spoke 2 extends through the connector 198 to include an exposed portion 199 and an impinged region 191 at its interface with the connector 198. Bracing element 190 includes bracing face 193 and hole 192, through which the spoke 2 is extended to pass. The bracing element 190 is representative of the spoke bed of a rim or of a hub flange to which the spoke 2 is connected.

As shown in FIG. 24b, and in contrast to embodiments which employ a configured surface in the spoke and/or the mating hole, both the outer surface of the spoke 2 and the hole 196 have generally smooth sidewalls. When the connector 198 is crimped to create a crimped joiner with the spoke 2, the smooth hole 196 squeezes and impinges on the smooth outer surface of the spoke 2 and causes the second end 6 to neck slightly in its impinged region 191, with its cross section shrinking slightly. However, the degree of mechanical interlock between the connector 198 and the spoke 2 is minimal, as compared with several of the previous embodiments that utilize a configured surface, and the crimped joiner relies primarily on a gripped frictional connection at connecting interface 200. It is noted that the exposed portion 199 external to the impinged region 191 maintains its original cross section, so that there exists a slight transition surface 197 between the impinged region 191 and the exposed portion 199. This transition surface 197 provides a secondary overlie engagement between the spoke 2 and connector 198.

With the application of spoke tension 30 along tensile axis 36, the spoke is drawn in direction 195 so that bearing surface 194 bears against bracing face 193 in an overlie engagement as shown in FIG. 24c. Thus the spoke 2 is firmly anchored against the bracing element 190 via the connector 198. This embodiment is illustrative of how the connector 198 may directly engage the bracing element 190 to support and brace against spoke tension 30. Of course, any manner of intermediate elements may alternatively be utilized between the spoke 2 and the bracing element 190 to optimize the interface between these two components. For example, it may be desirable to incorporate a flat washer (not shown) between the bearing surface 194 and the bracing face 193 to distribute this contact interface stress due to spoke tension 30 loads over a broader surface area of the bracing element 190. This embodiment also shows a general arrangement where the connector 198 includes a bearing surface 194 that creates a projected area of overlie that is generally perpendicular to the tensile axis 36 to create an overlie engagement to effectively terminate the spoke 2.

It should be noted that, the bearing surface 194 provides engagement geometry to engage the connector 198 directly to the bracing element 190. Bearing surface 194 has similar function to transition surface 32 of FIGS. 3a-b, however bearing surface 194 extends directly to the surface of the spoke 2, whereas transition surface 32 extends only to the shank portion 29. Such an arrangement with bearing surface 194 may be preferable, since there is no shank (i.e. shank portion 29 of FIGS. 3a-b) required, which allows the surface area of bearing surface 194 to be maximized and extend to the outer surface 191 of spoke 2.

Figure 25A:
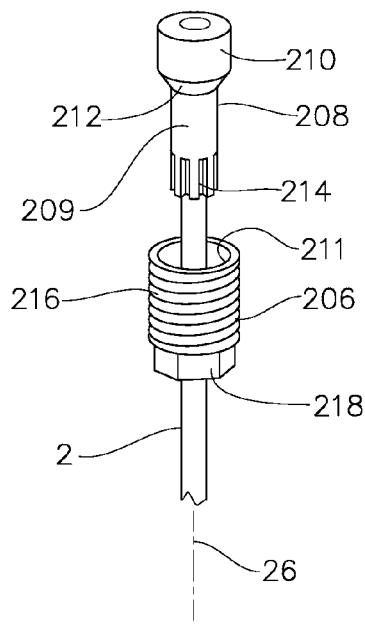
FIG. 25a is a partial perspective exploded view of an additional embodiment of the present invention, showing the spoke termination connector with gripping splines and including an intermediate connecting element.
Figure 25B:
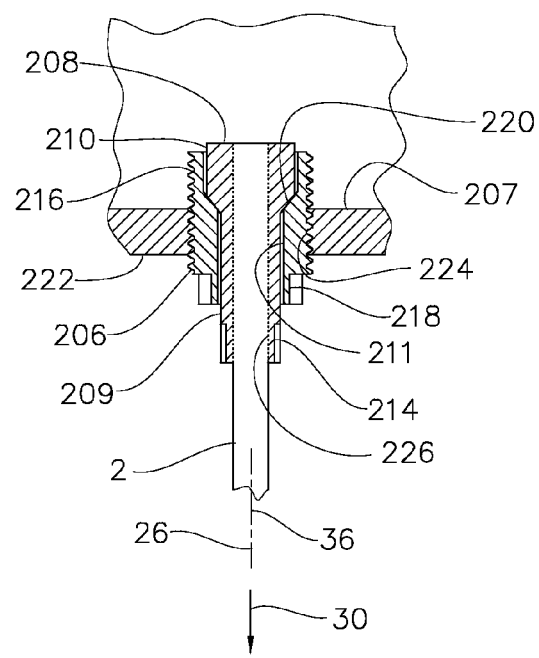
FIG. 25b is a partial cross-sectional view of the embodiment of FIG. 25a, showing the assembly of the spoke, connector, intermediate connecting member and rim.

FIGS. 25a-b describe an example illustrating how an intermediate connecting element, such as threaded ferrule 206, may be incorporated in the present invention. Connector 208 includes shank portion 209, enlarged portion 210 and a transition surface or flared shoulder 212 therebetween. One end of the connector 208 includes splines 214 to create a non-circular surface that may mate with a wrench (not shown) for rotational manipulation of the connector 208. Threaded ferrule 206 includes opening 211 therethrough and external threads 216 and flats 218 to mate with a wrench (not shown) for rotational manipulation of the threaded ferrule 206. The opening 211 includes a bearing surface or step 220 to create a closely matched bearing surface to mate with the flared shoulder 212 of the connector 208. Connector 208 is joined to the spoke 2 by means of a crimped joiner at an engagement interface 226. Engagement interface 226 is shown in FIGS. 25a-b to be generally schematic and to be merely representative of a wide range of engagement interfaces described variously herein. A bracing element, such as a rim 222 or hub flange (not shown), includes a threaded hole 224 to accept external threads 216, as shown in FIG. 25*b*.

As shown in FIG. 25*b*, threaded ferrule 206 is threadably assembled and engaged to the threaded hole 224. Spoke tension 30 is then applied to the spoke 2, which draws the flared shoulder 212 to bear against step 220 in an overlie engagement. The spoke 2 is now engaged to the spoke bed 207 by means of the connector 208 and the threaded ferrule 206. By utilizing separate wrenches on splines 214 and flats 218, the threaded ferrule 206 may be rotated independently from the connector 208 about the longitudinal axis 26. Threaded ferrule 206 may be rotated relative to rim 222 to adjust the effective length of the spoke 2, thus adjusting the spoke tension 30. Thus, it may be seen that the threaded ferrule 206 serves as an intermediate connecting element to facilitate the connection between the spoke 2 and the bracing element or rim 222. It is noted that the embodiment of FIGS. 25*a-b* employs a threaded engagement between the intermediate connecting element (threaded ferrule 206) and the bracing element (rim 222).

Figure 26A:
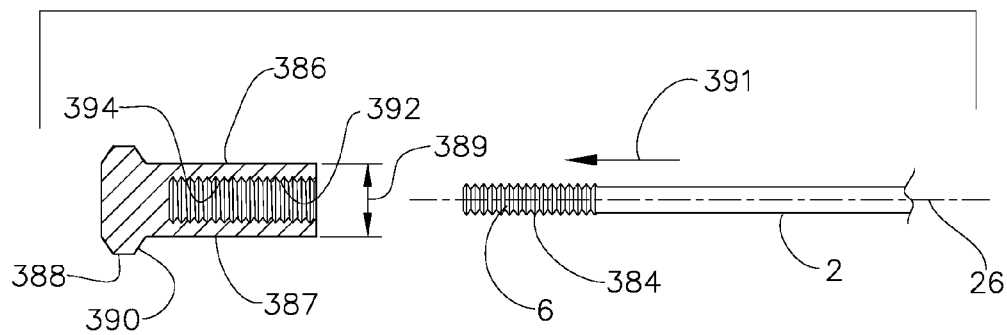
FIGS. 26a-b are partial cross-sectional views of an additional embodiment of the present invention, taken along the tensile axis, with the connector serving as a termination for a tensile element, and showing the sequence of operations involved in creating a crimped connection between the spoke and connector.
Figure 26B:
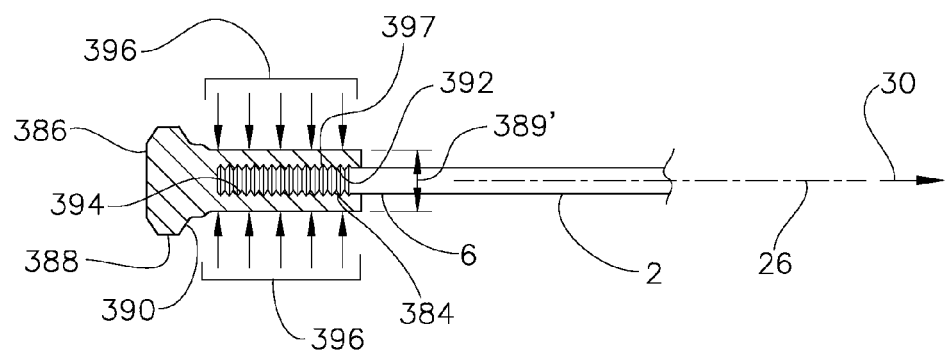

The embodiment of FIGS. 26*a-b* may be considered as a as a combination of the embodiment of FIGS. 6*a-b* and the embodiment of FIGS. 6*c-d*. As shown in FIGS. 26*a-b*, connector 386 includes a shank portion 387 with external dimension 389 and an enlarged head portion 388 with a transition surface 390 therebetween. Connector 386 also includes a blind cavity or hole 392 with an internal configured surface shown as internal ribs 394. Spoke 2 is shown here to be generally round in cross-section and includes longitudinal axis 26 and second end 6 with an external configured surface shown as external ribs 384 which are sized to have a clearance fit with the inside diameter of internal ribs 394. As shown in FIG. 26*a*, the second end 6 is first aligned with hole 392. Next, the spoke 2 is inserted into hole 392 in direction 391 and positioned such that the connector 386 overlaps the spoke 2 along the longitudinal axis 26 to create a pre-assembly between the spoke 2 and the connector 386.

Next, as shown in FIG. 26*b*, the connector 386 is crimped onto the spoke 2 with external crimp force 396 applied to the shank portion 387 of the connector 386 to cause this portion of the connector 386 to plastically deform and shrink to a reduced external dimension 389'. This deformation of the shank portion 387 causes the hole 392 to shrink such that the internal ribs 394 are shrunk into nested engagement with external ribs 384. Thus, external ribs 384 now have an overlie engagement with the internal ribs 394 at connecting interface 397 to securely join the connector 386 to the spoke 2 and to resist spoke tension loads 30. The connector 386 may then be connected to the rim 8 as described in FIGS. 3*a-b* or may alternatively be connected to the hub.

The embodiment of FIGS. 6*a-b* and 6*c-d* utilized the deformation of the softer spoke (FIGS. 6*a-b*) or the softer connector (FIGS. 6*c-d*) to create the conformed interlocking overlie engagement with the harder configured surface joined thereto. While this hardness differential may be utilized in the embodiment of FIG. 26*a-b*, this is not a requirement and both the connector 386 and second end 6 may be of similar hardness, since the interlocking internal ribs 394 and external ribs 384 are pre-formed prior to their crimped joinder.

While a clearance fit between internal ribs 394 and external ribs 384 may permit easy pre-assembly between the spoke 2 and the connector 386, the resultant clearance therebetween requires a relatively high degree of crimped shrinkage of the hole 392. In an alternative arrangement, the hole 392 may be originally sized to have an interference fit with the second end 6 of th spoke 2. The second end 6 may then be forcibly inserted into hole 392, with the crimp force 396 serving to cinch and tighten the fit between the hole and the second end 6. Or, for example, hole 392 may include internal threads that are sized to threadably engage with mating external threads of the second end 6 of the spoke. The second end is first threadably assembled to the hole and the resulting clearance between these internal threads and external threads is now comparatively small. The connector is then crimped as described above, which forces the internal threads of the connector to constrict on the external threads of the spoke to further secure this connection and eliminate any looseness or clearance between the two.

While my above description contains many specificities, these should not be construed as limitations on the scope of the invention, but rather as exemplifications of embodiments thereof.

While the connecting element of the present invention may be directly connected to the bracing element (such as the rim or the hub), there are many cases where it is desirable to include one or more intermediate connecting elements to facilitate this connection. For example, the connector may engage the intermediate connecting element and the intermediate connecting element may engage the bracing element.

While the embodiments described herein do not mention the use of adhesive or bonding agent to join the connecting element to the spoke, it is envisioned that the use of adhesive within the engagement interface may be utilized to augment the strength of the crimped joinder. In an exemplary arrangement, an epoxy paste adhesive may be applied to the internal hole of the connector and/or the external surface of the spoke prior positioning the spoke within the hole. The spoke is then inserted in the hole and the connector is crimped as previously described, thus trapping and compressing the adhesive within the connecting interface. After the adhesive is cured, the adhesive serves to further augment the joinder between the spoke and the connector.

The embodiments shown here show the spokes being held in tension, in the construction of tension-spoke wheels. This is for common illustration purposes only. It is understood that the spokes of these embodiments may alternatively be configured to be held in compression, in construction of compression-spoke wheels.

While several of the embodiments shown describe a single connector to anchor a single spoke, it is also envisioned that a multiplicity of connectors may be utilized to anchor a single spoke. For example, a multiplicity of connecting elements may be crimped to a single spoke, each having its own corresponding engagement interface. Alternatively, a single spoke may be joined to a single connecting element at a multiplicity of discreet engagement interfaces.

While the above description is particularly focused on bicycle or vehicle wheel spokes as tensile elements, and this is the preferred embodiment of the present invention, however it is envisioned that the present invention may be adapted to applications involving a wide range of tensile element applications outside of vehicle wheel applications. Some example applications may include control cables, guy wires, fiber optic cables, overhead high-tension lines, architectural and infrastructure cabling, pre-stressed rebar, etc.

Thus, the present invention provides a vehicle wheel that is inexpensive to produce, lends itself easily to high-volume manufacturing methods, is light in weight and is strong and reliable. Further, the present invention allows the connector to include geometry to optimize its engagement with the bracing element and/or an intermediate element. Further still, the present invention reduces wheel weight by facilitating the utilization of light weight materials, by allowing greater freedom in geometry to optimize the design, by facilitating the use of fiber reinforced spokes. Yet further, the present invention increases the strength and reliability of the wheel by reducing stresses in components and connections and by eliminating any clearances or relative movement between the hub and spokes.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A vehicle wheel, comprising:
a peripheral wheel rim;
a central hub with a central axle and an outer flange;
a plurality of spokes extending between said rim and said hub with a first portion connected to said rim and a second portion opposed to said first portion and connected to said hub and a span portion between said rim and said hub;
a bracing element including at least a portion of at least one of said rim and hub;
a connecting element connected to said bracing element;
wherein said spoke has a longitudinal axis, an external spoke surface, and a tensile axis of applied tensile load along said span portion;
wherein said connecting element includes an external surface and an internal cavity with an internal surface adjacent said spoke;
wherein said spoke overlaps said internal cavity along said longitudinal axis in an overlap region;
wherein said connecting element is joined to said spoke by means of a crimped joinder wherein at least a portion of said external surface is pressed to plastically deform said connecting element such that said internal surface is plastically displaced in a direction laterally proximal to said external spoke surface in said overlap region;
wherein said crimped joinder supports said tensile load at an engagement interface between said spoke and said connecting element;
wherein said spoke extends between said engagement interface and the opposing one of said first portion and said second portion thereof;
wherein said spoke comprises a singular unitary strand extending between said engagement interface and the opposing one of said first portion and said second portion thereof;
wherein said crimped joinder causes said internal surface of said connecting element to impinge on said spoke; and
including differential hardness between said external spoke surface and said internal surface of said internal cavity, wherein one of (i) said internal surface is harder than said external spoke surface such that said external spoke surface is deformed to conform to said internal surface by means of said crimped joinder and (ii) said external spoke surface is harder than said internal surface such that said internal surface is deformed to conform to said external spoke surface by means of said crimped joinder.

2. A vehicle wheel according to claim 1, wherein said crimped joinder serves to shrink said internal cavity of said connecting element to engage with said spoke at said engagement interface.

3. A vehicle wheel according to claim 1, wherein said engagement interface is directly between said connecting element and said spoke.

4. A vehicle wheel according to claim 1, wherein said spoke supports said tensile load in tension.

5. A vehicle wheel according to claim 1, wherein said spoke includes a first spoke portion and a second spoke portion discreet from said first spoke portion, wherein said first spoke portion is directly engaged to said second spoke portion, and wherein said crimped joinder serves to maintain said direct engagement between said first portion and second portion of said spoke.

6. A vehicle wheel according to claim 1, wherein said spoke includes a first spoke portion and a second spoke portion discreet from said first spoke portion, and wherein said connecting element serves as a coupling to connect said first spoke portion and said second spoke portion within said span portion.

7. A vehicle wheel according to claim 1, wherein said connecting element serves as a termination for said spoke.

8. A vehicle wheel according to claim 1, wherein said spoke comprises a singular one of said span portion.

9. A vehicle wheel according to claim 1, wherein said spoke is a duplex spoke, including two of said span portions and a common portion therebetween and wherein said crimped joinder is adjacent said common portion.

10. A vehicle wheel according to claim 1, wherein said crimped joinder is achieved by means of a first punch anvil and a second punch anvil to produce a crimping force in a direction laterally inwardly relative to said longitudinal axis to press said connecting element between said first punch anvil and said second punch anvil, and wherein said first punch anvil is laterally opposed to said second punch anvil.

11. A vehicle wheel according to claim 1, wherein said connecting element includes non-circular geometry to facilitate the manipulation of said connecting element about said longitudinal axis.

12. A vehicle wheel according to claim 1, wherein said crimped joinder serves to collapse said connecting element to create pinched folds therein.

13. A vehicle wheel according to claim 1, wherein said connecting element continuously surrounds the cross section of said spoke.

14. A vehicle wheel according to claim 1, wherein said connecting element includes a split such that said connecting element discontinuously surrounds the cross section of said spoke.

15. A vehicle wheel according to claim 1, wherein said external surface of said connecting element is pressed in a lateral direction generally perpendicular to said longitudinal axis to create said crimped joinder.

16. A vehicle wheel according to claim 1, wherein said external surface of said connecting element is pressed in a direction generally parallel to said longitudinal axis to create said crimped joinder.

17. A vehicle wheel according to claim 1, including an intermediate joining element, wherein said spoke is joined to said intermediate joining element and said intermediate joining element is joined to said connecting element, and wherein said crimped joinder serves to at least one of: (i) join said spoke to said intermediate joining element; and (ii) join said intermediate joining element to said connecting element.

18. A vehicle wheel according to claim 1, wherein a multiplicity of said spokes are joined to a single one of said connecting element by means of said crimped joinder.

19. A vehicle wheel according to claim 1, wherein said connecting element includes a multiplicity of said internal cavities and wherein a multiplicity of said spokes are each joined to a corresponding one of said internal cavities by means of said crimped joinder.

20. A vehicle wheel according to claim 1, wherein said crimped joinder serves to join a multiplicity of said spokes to a single one of said internal cavity.

21. A vehicle wheel according to claim 1, wherein said connecting element is one of integral and unitary with said bracing element.

22. A vehicle wheel according to claim 1, wherein said internal cavity is a blind cavity of limited depth.

23. A vehicle wheel according to claim 1, wherein said internal cavity is a through cavity that extends through said connecting element.

24. A vehicle wheel according to claim 1, wherein said spoke includes high strength fibers encapsulated in a matrix, and wherein at least a portion of said high strength fibers are aligned generally parallel to said longitudinal axis.

25. A vehicle wheel according to claim 24, wherein said high strength fibers are continuous fibers.

26. A vehicle wheel according to claim 1, wherein said spoke has a polymer external spoke surface at said engagement interface.

27. A vehicle wheel according to claim 1, wherein said spoke has steel external spoke surface at said engagement interface.

28. A vehicle wheel according to claim 1, wherein said connecting element is comprised of a metallic material consisting primarily of at least one of aluminum and magnesium.

29. A vehicle wheel according to claim 1, wherein said internal surface of said cavity grips said external spoke surface at said engagement interface.

30. A vehicle wheel according to claim 1, wherein said internal surface is harder than said external spoke surface such that said external spoke surface is deformed to conform to said internal surface by means of said crimped joinder.

31. A vehicle wheel according to claim 30, wherein said internal cavity of said connecting element includes a configured internal surface and wherein said external spoke surface is deformed to at least partially conform to said configured internal surface at said engagement interface by means of said crimped joinder such that said configured internal surface is engaged to said external spoke surface in an overlie engagement to limit relative movement between said spoke and said connecting element along said longitudinal axis.

32. A vehicle wheel according to claim 31, wherein said configured internal surface includes a helical internally threaded surface.

33. A vehicle wheel according to claim 1, wherein said external spoke surface is harder than said internal surface such that said internal surface is deformed to conform to said external spoke surface by means of said crimped joinder.

34. A vehicle wheel according to claim 33, wherein said spoke includes a configured external spoke surface and wherein said internal surface is deformed to at least partially conform to said external spoke surface at said engagement interface by means of said crimped joinder such that said internal surface is engaged to said configured external spoke surface in an overlie engagement to limit relative movement between said spoke and said connecting element along said longitudinal axis.

35. A vehicle wheel according to claim 34, wherein said configured external spoke surface includes at least one of a helical external threaded external spoke surface, a transition surface, a knurled external spoke surface, a ribbed external spoke surface, a warped external spoke surface and an indented external spoke surface.

36. A vehicle wheel according to claim 1, wherein said engagement interface includes a longitudinal engagement between said connecting element and said spoke, wherein the longitudinal length of said longitudinal engagement is greater than twice the cross sectional thickness of said spoke at said engagement interface.

37. A vehicle wheel according to claim 1, wherein said engagement interface includes a frictional engagement.

38. A vehicle wheel according to claim 1, wherein at least one of said external spoke surface and said internal surface includes noncircular cross section geometry and wherein said noncircular geometry creates a rotationally keyed engagement between said spoke and said connecting element at said engagement interface.

39. A vehicle wheel according to claim 1, wherein said internal cavity of said connecting element includes a configured internal surface prior to said crimped joinder, and wherein said spoke includes a configured external spoke surface prior to said crimped joinder, and wherein said crimped joinder serves to reduce clearance between said configured internal surface and said configured external spoke surface such that said configured internal surface is engaged to said configured external spoke surface in an overlie engagement to limit relative movement between said spoke and said connecting element along said longitudinal axis.

40. A vehicle wheel according to claim 1,
wherein said connecting element includes an engagement surface, and wherein said connecting element is connected to said bracing element by means of an overlie engagement at said engagement surface to limit relative movement between said connecting element and said bracing element along said tensile axis.

41. A vehicle wheel according to claim 40, wherein said connecting element is engaged to said bracing element by means of a direct overlie engagement between said engagement surface and said bracing element.

42. A vehicle wheel according to claim 40, wherein said connecting element includes helical threaded geometry comprising a helical rib projecting laterally relative to said longitudinal axis, and wherein said helical thread geometry includes said engagement surface, and wherein said connecting element is engaged to said bracing element by means of a threaded engagement at said helical threaded geometry.

43. A vehicle wheel according to claim 40, wherein said connecting element includes a lateral projecting surface thereof that extends generally laterally relative to said longitudinal axis, and wherein said engagement surface includes said laterally projecting surface.

44. A vehicle wheel according to claim 40, wherein said engagement surface is a lateral engagement surface that extends laterally outwardly relative to said longitudinal axis.

45. A vehicle wheel according to claim 40, wherein said engagement surface is a lateral engagement surface that extends laterally inwardly relative to said longitudinal axis of said span portion.

46. A vehicle wheel according to claim 40, including an intermediate connecting element, wherein said connecting element is connected to said intermediate connecting element, and wherein said intermediate connecting element is connected to said bracing element, and wherein said overlie engagement is at least one of (i) between said connecting element and said intermediate connecting element, and (ii) between said intermediate connecting element and said bracing element.

47. A vehicle wheel according to claim 40, wherein said connecting element includes a transition shoulder surface extending laterally relative to said longitudinal axis between a shank portion and an enlarged portion thereof and wherein said engagement surface includes said transition shoulder surface.

48. A vehicle wheel according to claim 40, wherein said connecting element includes an end surface thereof extending laterally outwardly relative to said longitudinal axis from said spoke, and wherein said engagement surface includes said end surface.

49. A vehicle wheel according to claim 40, wherein said engagement surface generally circumscribes said longitudinal axis.

50. A vehicle wheel according to claim 40, wherein said connecting element is connected to said bracing element by means of a threadable engagement.

51. A vehicle wheel, comprising:
a peripheral wheel rim;
a central hub with a central axle and an outer flange;
a plurality of spokes extending between said rim and said hub with a first portion connected to said rim and a second portion opposed to said first portion and connected to said hub and a span portion between said rim and said hub;
a bracing element including at least a portion of at least one of said rim and hub;
a connecting element connected to said bracing element;
wherein said spoke has a longitudinal axis, an external spoke surface, and a tensile axis of applied tensile load along said span portion;
wherein said connecting element includes an external surface and an internal cavity with an internal surface adjacent said spoke;
wherein said spoke overlaps said internal cavity along said longitudinal axis in an overlap region;
wherein said connecting element is joined to said spoke by means of a crimped joinder wherein at least a portion of said external surface is pressed to plastically deform said connecting element such that said internal surface is plastically displaced in a direction laterally proximal to said external spoke surface in said overlap region;
wherein said crimped joinder supports said tensile load at an engagement interface between said spoke and said connecting element;
wherein said spoke extends between said engagement interface and the opposing one of said first portion and said second portion thereof;
wherein said spoke comprises a singular unitary strand extending between said engagement interface and the opposing one of said first portion and said second portion thereof; and
wherein a cross-sectional dimension of said spoke is reduced in a direction lateral to said longitudinal axis and corresponding to said laterally proximal plastic displacement.

* * * * *